(12) United States Patent
Hirama

(10) Patent No.: US 8,485,977 B2
(45) Date of Patent: Jul. 16, 2013

(54) ULTRASOUND DIAGNOSIS APPARATUS

(75) Inventor: Makoto Hirama, Tochigi-ken (JP)

(73) Assignees: Kabushiki Kaisha Toshiba, Tokyo (JP); Toshiba Medical Systems Corporation, Otwara-shi (JP)

( * ) Notice: Subject to any disclaimer, the term of this patent is extended or adjusted under 35 U.S.C. 154(b) by 298 days.

(21) Appl. No.: 12/414,290

(22) Filed: Mar. 30, 2009

(65) Prior Publication Data
US 2009/0326377 A1 Dec. 31, 2009

(30) Foreign Application Priority Data
Mar. 31, 2008 (JP) .................................. P2008-93812

(51) Int. Cl.
*A61B 8/00* (2006.01)
(52) U.S. Cl.
USPC ............ 600/447; 600/407; 600/443; 367/140
(58) Field of Classification Search
USPC .................... 600/407, 437, 447, 463; 73/584, 73/596, 597; 367/119, 125, 153, 140
See application file for complete search history.

(56) References Cited

U.S. PATENT DOCUMENTS

| | | | | |
|---|---|---|---|---|
| 5,421,333 | A | * | 6/1995 | Takamizawa et al. ......... 600/447 |
| 5,831,168 | A | * | 11/1998 | Shinomura et al. ............ 73/602 |
| 6,551,246 | B1 | * | 4/2003 | Ustuner et al. ............... 600/447 |
| 6,677,985 | B1 | * | 1/2004 | Kubota et al. .................... 348/77 |
| 2003/0199763 | A1 | * | 10/2003 | Angelsen et al. ............. 600/437 |
| 2005/0222506 | A1 | * | 10/2005 | Takimoto et al. ............. 600/455 |
| 2007/0016066 | A1 | * | 1/2007 | Lee et al. ........................ 600/463 |
| 2007/0083119 | A1 | * | 4/2007 | Adachi et al. ................. 600/437 |

FOREIGN PATENT DOCUMENTS

| | | |
|---|---|---|
| JP | H4-250149 | 9/1992 |
| JP | 7-323029 | 12/1995 |
| JP | H10-179579 | 7/1998 |
| JP | H10-277042 | 10/1998 |
| JP | 2000-28589 | 1/2000 |
| JP | 2006-223736 | 8/2006 |

OTHER PUBLICATIONS

Japanese Office Action mailed on Oct. 2, 2012, issued for JP Application No. 2008-093812 (with English translation).

* cited by examiner

*Primary Examiner* — James Kish
*Assistant Examiner* — Michael N Fisher
(74) *Attorney, Agent, or Firm* — Oblon, Spivak, McClelland, Maier & Neustadt, L.L.P.

(57) ABSTRACT

An ultrasound diagnosis apparatus that can acquire ultrasound image data having excellent spatial resolution and contrast resolution by electrically controlling focusing points of transmission/reception waves so as to form transmitting beams and receiving beams having substantially uniform thin beam width along an elevation direction. Ultrasounds emitted from a prescribed number of transducers are focused at a hypothetical point sound source. Wave-fronts reflect at a plurality of observing points. Ultrasounds reflected at the observing points are received through a prescribed number of transducers generating a plurality of channels of receiving signals, which are focused by performing phase compensation and summation so that the observing point becomes a reception focusing point. The receiving signals are focused to correct transmitting delays due to propagation distances between the transmitting focusing point and the observing points.

22 Claims, 12 Drawing Sheets

ULTRASOUND DIAGNOSIS APPARATUS

CROSS-REFERENCE TO RELATED APPLICATIONS

This application claims priority from, and the benefit of, Japanese Patent Application No. 2008-93812, filed on Mar. 30, 2008, the contents of which are expressly incorporated herein by reference in their entirety.

BACKGROUND OF THE INVENTION

1. Field of the Invention

The present invention relates to an ultrasound diagnosis apparatus capable of generating ultrasound images of a high spatial resolution and a high contrast resolution, and more particularly, to an ultrasound diagnosis apparatus capable of transmitting and receiving transmission beams and reception beams, each having substantially uniform thin beam width along an elevation direction, from and to ultrasound transducers.

2. Description of the Related Art

An ultrasound diagnosis system transmits ultrasound pulses from ultrasound transducers (hereinafter "transducers") installed in a head portion of the ultrasound probe to an object, such as a patient. The transducers receive reflected (echo) ultrasounds that are generated in accordance with differences of acoustic impedances of organs in the object in order to display the organ images on a monitor. Since an ultrasound image diagnosis apparatus can easily obtain and display a two dimensional image or a three dimensional image of B mode data or color Doppler data in real time by simply touching an ultrasound probe to a patient's body surface, it is widely used as an apparatus for diagnosing the status of a target organ in a patient's body.

A recent ultrasound diagnosis apparatus can electronically control ultrasound transmission/reception directions and focusing points of the transmission/reception waves in order to improve a spatial resolution and a high contrast resolution of image data. Doing so, the ultrasound transmission beams are focused by controlling delay times for the respective transmitting drive signals supplied to each of a plurality of transducers in an array, and the ultrasound reception (echo) signals acquired through a plurality of transducers are also focused by giving the respective delay times to each of the echo signals with performing receiving phase compensation for focusing and summation (hereinafter, simply referred to as "phase compensation and summation" or "phase compensation/summation").

When a plurality of receiving signals acquired through the plurality of reception transducers are focused by performing the phase compensation and summation to each of the receiving signals, the respective reception timing of the echo signals reflected in the object are depended on an elevation (depth) distance from the transducer surfaces to the reflection body. Consequently, a particular method has been developed to form the focused reception beams along a depth (elevation) direction in the object by successively renewing the delay time that is applied to the reception signals acquired in time series through a plurality of reception transducers (hereinafter, "dynamic focusing method").

When a plurality of transmission beams are focused by controlling each delay time for the transmission driving signals, the transmitting ultrasounds emitted from each of the plurality of transducers propagate into the object to a prescribed transmission focusing point based on transmission wave-fronts determined by the delay times for the driving signals. FIG. 6A illustrates a focusing status of the transmission beams by controlling the delay times for transmission driving signals. Thus, the focusing area of the transmission beams is limited on and around a transmission focusing distance (20 mm point in FIG. 6A). However, the transmission beams apart from the focusing point have wide beam widths along an azimuth direction at the shallower area (10 mm point in FIG. 6A) or the deeper area (30 mm point in FIG. 6A) than the focusing area along elevation direction.

The spatial resolution and the contrast resolution of ultrasound images data are highly dependent on the transmitting beam width and the receiving beam width. Consequently, when the transmitting beam widths are substantially different at the depths, remarkable differences occur between the quality of the image data generated around the area of the transmission focusing point and the quality of the image data generated at the distances apart from the transmission focusing point.

Typically, when a strong beam focusing is executed by using a transducers group having a large width used for a transmission (i.e. a large transmission aperture), a conspicuous deterioration of image data quality occurs at the areas apart from the transmission focusing point. On the contrary, when a weak beam focusing is executed by using a small transmission aperture, it becomes impossible to narrow a beam width for a transmission focusing area. A signal to noise ratio (S/N) of image data also deteriorates in company with a reduction of the transmission power.

To measure these problems, Japanese patent application publication 2007-323029 has proposed an improved method for generating image data of a good quality by setting a plurality of transmission focusing points along an elevation direction for repeated ultrasound transmissions/receptions along with successively renewing the transmission focusing point in order to extract the reception signals that are acquired from each of the transmission focusing points and the vicinity areas only. Hereinafter, this method is referred as a "multi-stages focusing method".

However, the multi-stages focusing method needs to repeat ultrasound transmissions many times to the different transmission focusing points in the same direction in order to form transmission beams having a substantially uniform thin beam width along an elevation direction. Accordingly, the proposed multi-stages focusing method has a problem in that a time resolution (frame rate) for acquiring the image data is remarkably deteriorated. Further, the proposed multi-stages focusing method has another problem in that the transmission energy emitted into the object can not be effectively used since the receiving signals are acquired at areas other than the transmission focusing area.

SUMMARY OF THE INVENTION

To solve the above-mentioned conventional problems and defects, the present invention provides a new ultrasound diagnosis apparatus that can acquire ultrasound image data having excellent spatial resolution and contrast resolution by electrically controlling focusing points of transmission/reception waves so as to form transmitting beams and receiving beams having a substantially uniform thin beam width along an elevation direction in an object.

In the ultrasound diagnosis apparatus consistent with the present invention, transmission ultrasounds emitted from a prescribed number of transducers are focused at a hypothetical point sound source. Transmitting wave-fronts propagated from the point sound source reflect at a plurality of observing points in the propagation area. Reception ultrasounds reflected at the observing points are received through a prescribed number of receiving transducers so as to generate a plurality of channels of receiving signals. The receiving signals are focused by performing receiving phase compensation and summation so that the observing point becomes a reception focusing point. The phase compensated and summed receiving signals are focused by performing wave-front phase compensation and summation in order to correct transmitting delays due to the propagation distances between the transmitting focusing point and the observing points.

One aspect of the ultrasound diagnosis system consistent with the present invention is an ultrasound diagnosis apparatus configured to generate image data based on reception signals acquired through an ultrasound transmission/reception to and from an object, the ultrasound diagnosis apparatus comprising:

an ultrasound probe including a pair of a plurality of transmitting transducer groups and a receiving transducer group, each group including a plurality of transducers;

a transmission unit configured to drive each of the plurality of transmitting transducer groups in order to emit focusing wave-fronts or propagation wave-fronts so as to form a hypothetical point sound source for the object;

a receiving phases compensation/summation unit configured to perform receiving phases compensation for focusing and summation of a plurality of channels of receiving signals acquired through the receiving transducer group based on reflected ultrasounds from observing points in the object;

a transmitting phases compensation/summation unit configured to perform phases compensation and summation for a plurality of channels of receiving signals that are acquired through ultrasound transmissions/receptions by the receiving transducer group and the plurality of transmitting transducer groups that successively renew the point sound source;

a scanning control unit configured to perform ultrasound scans to the object by controlling directions for the ultrasound transmissions/receptions; and an image processing unit to generate ultrasound image data based on the phases compensated and summed receiving signals acquired through the ultrasound scans.

Another aspect of the ultrasound diagnosis apparatus consistent with the present invention is an ultrasound diagnosis apparatus configured to generate image data based on reception signals acquired through ultrasound transmissions and receptions, the ultrasound diagnosis apparatus is comprising:

an ultrasound probe including a pair of a plurality of transmitting transducer groups and a receiving transducer group, each group including a plurality of transducers;

a transmission unit configured to drive each of the plurality of transmitting transducer groups in order to emit focusing wave-fronts or propagation wave-fronts so as to form a hypothetical point sound source for the object;

a receiving phases compensation/summation unit configured to perform receiving phases compensation for focusing and summation of a plurality of channels of receiving signals acquired through the receiving transducer groups for successively renewing the position of the point sound source;

a scanning control unit configured to perform ultrasound scans of the object by controlling directions for the ultrasound transmissions/receptions; and an image processing unit configured to generate ultrasound image data based on the phases compensated and summed receiving signals acquired through the ultrasound scans.

In the ultrasound diagnosis apparatus consistent with the present invention, transmission ultrasounds emitted from a plurality of transmitting transducers are focused at a hypothetical point sound source, and reflect at the observing point positioned in transmission wave-fronts propagated from the hypothetical point sound source. The reflected ultrasounds are received through a plurality of receiving transducers. The acquired receiving signals through the plurality of receiving transducers have performed receiving phase compensation for focusing and summation and have further performed transmitting wave-front compensation and summation. By doing so, it becomes possible to generate transmission beams and reception beams that have substantially uniform thin width along an elevation direction to an object with high accuracy and high sensitivity. By successively renewing the hypothetical point sound source, it becomes possible to utilize echo signals reflected from the observing points in the transmitting wave-front area to the maximum extent possible. Further, it becomes possible to generate and display excellent image data of high spatial resolution and high contrast resolution in a high signal to noise (S/N) ratio without reducing time resolution (frame rate) of the image data.

BRIEF DESCRIPTION OF THE DRAWINGS

The accompanying drawings, which are incorporated in and constitute part of this specification, illustrate various embodiments and/or features of the present invention, and together with the description, serve to explain embodiments of the present invention. Where possible, the same reference number will be used throughout the drawings to describe the same or like parts. In the drawings.

DESCRIPTION OF THE EMBODIMENTS

The preferred embodiments of an ultrasound diagnosis apparatus consistent with the present invention, a plurality of hypothetical point sound sources is formed at optional position by focusing transmission ultrasounds emitted from a plurality of transducers at a prescribed transmission converging point. Based on the transmitting ultrasound wave-fronts emitted from the hypothetical point sound source, echo ultrasounds reflected at an optionally designated observing point are received through a plurality of transducers constructing a receiving transducer group. The acquired receiving signals of a plurality of channels have performed receiving phase compensation for focusing and summation so as that each of the observing points becomes a receiving focusing point. Further, a plurality of receiving signals acquired by successively shifting a pair of the plurality of the receiving transducer groups and the transmitting transducer group along an arrangement direction of the plurality of transducers have also performed the same receiving phases compensation for focusing and summation. The phase compensated and summed receiving signals have performed transmitting wave-front compensation and summation for correcting relative transmitting delays due to propagation differences from the transmitting focus points to the observing point. By doing so, it becomes possible to generate transmission beams and reception beams that have a substantially uniform thin width along an elevation direction of an object in high accuracy and high sensitivity. Further, it becomes possible to effectively use echo signals reflected in the transmitting wave-front from the hypothetical point sound source to the maximum extent possible. Thus, it becomes possible to generate and display excellent image data of high spatial resolution and high contrast resolution in a high signal to noise (S/N) ratio without reducing time resolution (frame rate) of the image data.

Figure 1:
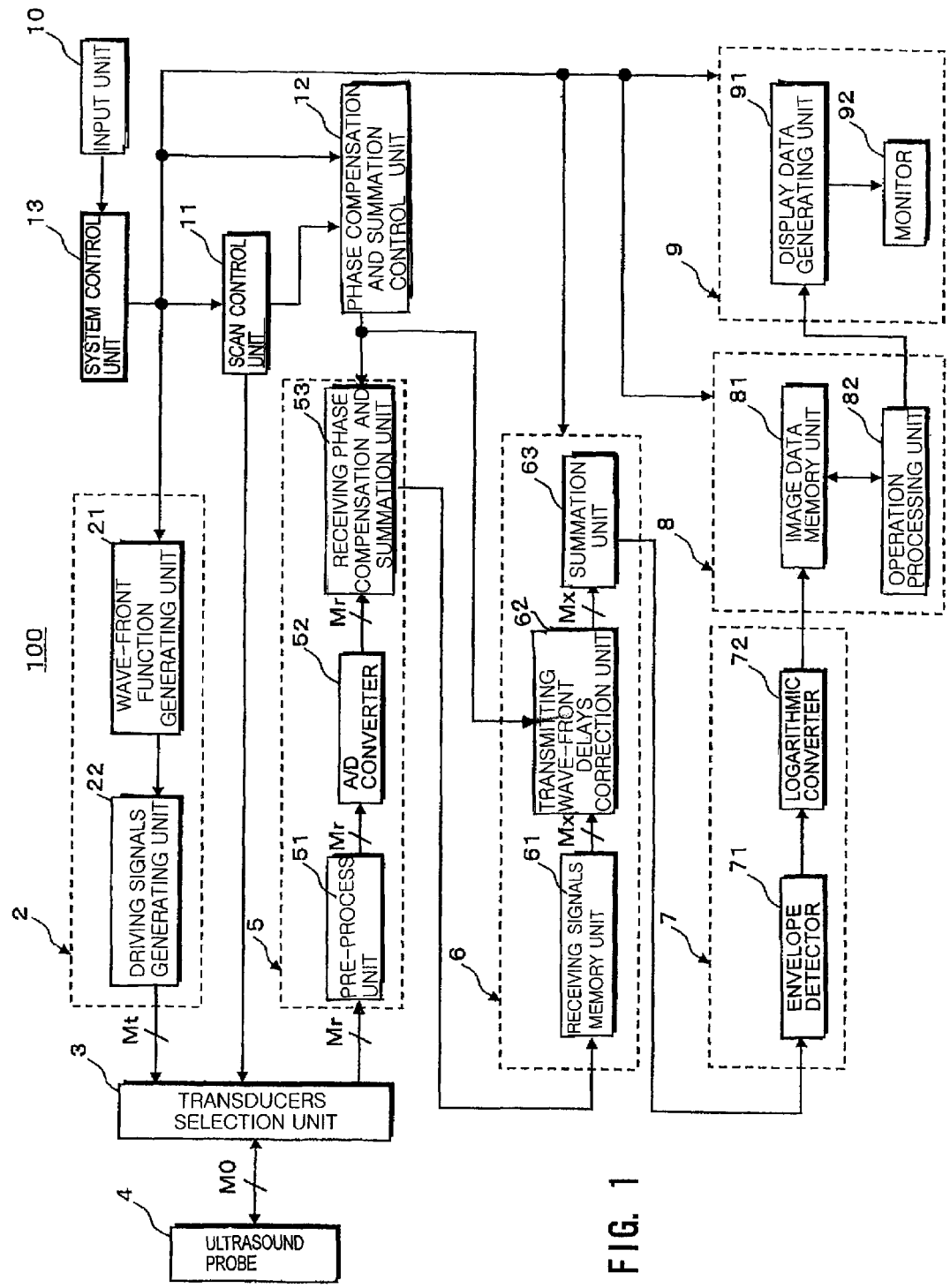
FIG. 1 is a block diagram illustrating an ultrasound diagnosis apparatus in accordance with a preferred embodiment of the present invention.
Figure 2:
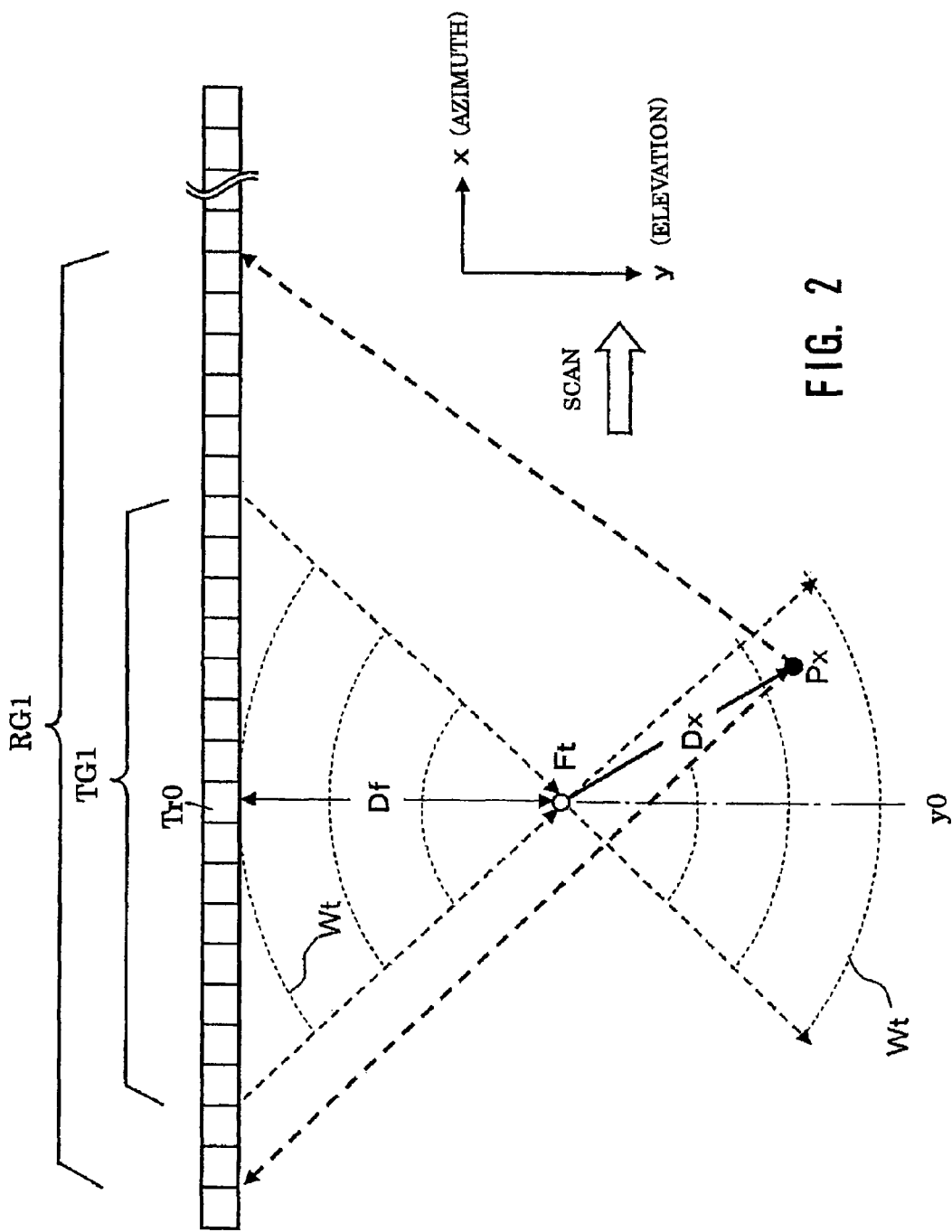
FIG. 2 illustrates a receiving method according to the embodiment when propagating directions of a transmitting wave-front is reflected at an observing point that is located at a deeper position than a hypothetical transmission focus point.

With reference to FIGS. 1-5, one embodiment of a linear scan type ultrasound diagnosis apparatus consistent with the present invention is explained. Thus, as shown in FIG. 2, an ultrasound probe in this embodiment includes a plurality (Mo) of transducers linearly arranged. Of course, the present invention is applicable to a sector scan type ultrasound diagnosis apparatus and a convex scan type ultrasound diagnosis apparatus.

In FIG. 1, an ultrasound diagnosis system 100 is comprised of an ultrasound probe 4 including a plurality (Mo) of transducers in a head portion, a transducers selection unit 3 for selecting a plurality (Mt) of ultrasounds transmitting transducers and a plurality (Mr) of receiving reflected ultrasounds, a transmission unit 2 for supplying transmission driving signals to the transducers selection unit 3, a reception unit 5 for receiving reflected ultrasounds through the plurality of transducers selected by the transducers selection unit 3 and a transmitting wave-front phase compensation and summation unit 6. As illustrated in FIG. 1, the ultrasound diagnosis apparatus 100 further includes an image signal generating unit 7, an image data generating unit 8, a display unit 9, an input unit 10, a scan control unit 11, a phasing control unit 12 and a system control unit 13.

The linear scan type ultrasound probe 4 includes a plurality (M) of linearly arrayed transducers provided on a tip portion of the probe. Ultrasound transmissions and receptions are performed by touching the tip portion to a body surface of an object. Often, a gel is used as an intermediary between the body surface and probe surface. The transducers convert drive signals to transmission ultrasound and echo ultrasound wave to reception signals. Each of the plurality of transducers is coupled to the transducers selection unit 3 through a cable carrying a plurality (M0) of channels. The scan control unit 11 is connected to the transducer selection unit 3 in order to control ultrasound scans onto the object by selecting transducers for using the ultrasound transmissions and receptions.

The transducers selection unit 3 selects a transmitting transducer group TG1 of a plurality (Mt) of transducers and a receiving transducer group RG1 of a plurality (Mr) of transducers among the plurality (Mo) of transducers arrayed in the ultrasound probe 4. For better understanding, in the embodiments, the relationship among these numbers is preferred such that Mo>Mr>Mt. Of course, it is also possible to set the number Mt of transmitting transducer group TG1 to be larger than the number Mr of the receiving transducer group RG1. The selected transducer groups TG1 and RG1 are respectively connected to the transmission unit 2 and the reception unit 5.

As illustrated in FIG. 2, the transmitting transducer group TG1 including a number Mt of adjoined transducers selected by the transducers selection unit 3 transmits ultrasound pulses (transmitting ultrasounds). The transmitting ultrasound pulses are controlled so as to focus at a prescribed distance Ft along a depth (elevation) direction in the object. Ultrasound echo signals reflected at an observing point in the object that are located in an ultrasound transmitting wave-front area are received through the receiving transducer group RG1 including a number Mr of adjoining transducers selected by the transducers selection unit 3. The received signals are converted to electrical signals.

The transmission unit 2 includes a wave-front function generating unit 21 and a drive signal generating unit 22. The wave-front function generating unit 21 generates a transmission wave-front function for focusing transmission ultrasounds at an initially designated transmitting focus distance Ft through the input unit 10. Based on the transmission wave-front function, driving delay times for the respective transducers in the transmitting transducer group TG1 are determined. Each of the driving delay times is determined by the number of the transmission transducers, an array distance between the adjoining transducers and the transmitting focus distance. For instance, the driving delay time is calculated by an arithmetic circuit. It is also possible to store a preliminarily calculated driving delay time in a look-up table.

The drive signal generating unit 22 generates drive signals of Mt channels. Each of drive signals has a driving delay time, a prescribed amplitude and a wave form that are supplied from the wave-front function generating unit 21. The generated drive signals of Mt channels are supplied to the transmitting transducer group TG1 selected by the transducers selection unit 3. Thus, based on the signals supplied from the wave-front function generating unit 21, the drive signals of Mt channels are supplied to each of the transducers in the transmitting transducer group TG1 from the drive signal generating unit 22 so as to emit transmitting ultrasounds to the object and are focused at a prescribed elevation distance Ft in the object.

The reception unit 5 includes a pre-processing unit 51, an A/D converter 52 and a receiving phase compensation for focusing and summation (hereinafter, "receiving phase compensation/summation") unit 53. The pre-processing unit 51 includes an amplifier for keeping a sufficient S/N ratio by amplifying transducer group RG1 through the transducers selection unit 3 and a filter circuit for limiting band-pass to the receiving signals outputted from the amplifier in order to prevent alien noises from occurring during sampling operations of the A/D converter 52. If necessary, a limiter circuit may be provided to an input terminal of the amplifier in order to protect from a drive signal of a high voltage generated in the drive signal generating unit 22 in the transmission unit 2.

The receiving signals of Mr channel processed in the pre-processing unit 51 are converted to the digital signals in the A/D converter unit 52 and supplied to the receiving phase compensation/summation unit 53. The receiving phase compensation/summation unit 53 includes a receiving delay correction circuit and an accumulator.

The receiving delay correction circuit in the receiving phase compensation/summation unit 53 supplies delay times to the reception signals of Mr channels outputted from the A/D converter 52 for focusing the receiving ultrasounds reflected at an observing point Px based on the delay time data supplied from the phase compensation and summation control unit 12. Thus, the receiving delay correction circuit gives delay times for correcting the reception delays occurring due to the differences of propagated distances from the observing point Px to each of the transducers in the receiving transducers group.

The accumulator in the receiving phase compensation/summation unit 53 adds and compounds the receiving signals supplied from the receiving delay correction circuit. Consequently, the receiving signals of Mr channel are arranged in phase for focusing and summed through the reception delay correction circuit and the accumulator. The phase compensated and summed receiving signals of Mr channel are supplied to the transmitting wave-front compensation and summation unit 6 and stored in a receiving signals memory circuit 61 in the transmitting wave-front compensation and summation unit 6.

In the embodiment consistent with the present invention, the transducer selection unit 3 select a plurality (Mx) of transmitting transducer groups TG1, TG2, - - - , TGx corresponded to one receiving transducer group RG1 in order to form a substantially uniform thin beam width of transmission beams and reception beams along a depth (elevation) direction. By successively shifting the pair of transmitting transducer groups and the receiving transducer group, the receiving transducer group RG1 converts each of reflected ultrasounds corresponded to each of the plurality of transmitting transducer groups into the receiving signals of Mx channels. The receiving signals of Mx channels have performed receiving phase compensation for focusing and summation. After that the phase compensated and summed receiving signals have performed transmitting wave-front compensation and summation in the transmitting wave-front compensation and summation unit 6.

The image signal generating unit 7 generates B-mode image signals by processing the receiving signals that have performed transmitting wave-front compensation and summation in the transmitting wave-front compensation and summation 6. The image signal generating unit 7 includes an envelope detector 71 and a logarithmic converter 72. The envelope detector 71 detects an envelope of receiving signals supplied from the adder 63 in the transmitting wave-front compensation and summation unit 6. The logarithmic converter 72 generates B mode data in which a small signal amplitude is relatively emphasized by performing logarithmic conversion of the calculated envelope. The generated B mode data is supplied to the image data processing unit 8. It is possible to construct the image signal generating unit by replacing an order of the envelope detector 71 and the logarithmic converter 72.

The image processing unit 8 generates B mode image data based on a plurality of image signals acquired through ultrasound scans with renewing transmission/reception directions by shifting the pair of the plurality (Mx) of transmitting transducer groups and the receiving transducer group along an arrayed direction of the transducers. The image processing unit 8 includes an image data memory unit 81 and an operation processing unit 82. The image data memory unit 81 successively stores image data supplied from the logarithmic converter 72 in the image data generation unit 7 corresponding to each position data of the observing point Px. The operation processing unit 82 reads 2-D (dimensional) image data stored in the image data memory unit 81 and generates B mode image data by performing an interpolation process and a filtering process, if necessary.

The display unit 9 includes an image data generator 91 and a monitor 92. The image data generator 91 converts the image data generated in the image data generating unit 8 into a prescribed displaying format and generates display data with attaching affixing data, such as an object data or conditions for generating image data. The generated display data is displayed on the monitor 92 after performing a digital-to-analog conversion, for example.

The input unit 10 includes a display panel and input devices on an operation panel. As the input devices, such as a keyboard, truck-ball, mouse, selection buttons or input buttons may be used. Further the input unit 10 includes a focus distance setting unit for setting a transmission focusing distance Df between the surface of the ultrasound probe 4 and the transmission converging point Ft and a transducers number setting unit for setting the number (Mt) of the transmission transducers and the number (Mr) of the reception transducers. Further, various setting operations, such as input of the object data, setting of image data generating conditions and image data displaying conditions and input of various commands, are performed through the display panel and the input devices.

The scan control unit 11 controls ultrasound scans over the object by controlling the transducers selection unit 3 so that the transmitting transducers group and the receiving transducers group for using the ultrasound transmission/reception are selected from among the plurality (M0) of transducers arrayed in the azimuth direction. The scan control unit 11 is connected to transducers selection unit 3 for controlling the ultrasound scans onto an object by selecting transducers for using the respective ultrasound transmissions and receptions.

The phase compensation and summation unit 12 controls the receiving phase compensation for focusing and summation in the reception unit 2, and the transmitting wave-front delay correction unit 62 in the transmitting wave-front compensation and summation unit 6.

The system control unit 13 totally controls above-mentioned units in the ultrasound diagnosis apparatus 100.

Figure 3:
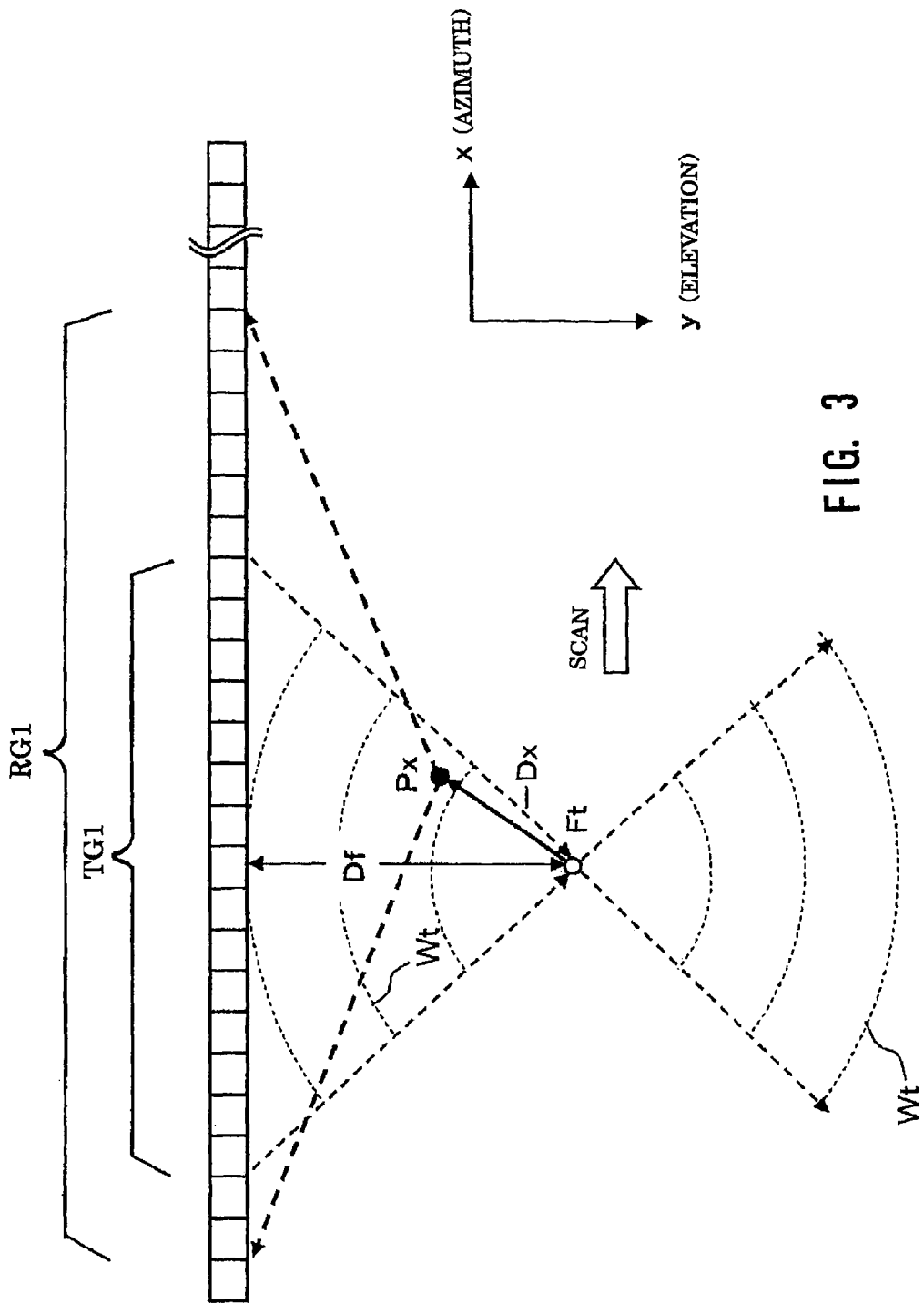
FIG. 3 illustrates a receiving method according to the embodiment when propagating directions of a transmitting wave-front is reflected at an observing point that is located at a shallow position than a hypothetical transmission focus point.

FIGS. 2 and 3 illustrate wave-fronts of transmission ultrasounds emitted from the transmitting transducer group TG1 based on the drive signals supplied from the drive signal generation unit 22. As illustrated in FIG. 2, the transmission ultrasounds are emitted to a transmission focusing point Ft located at a distance Df from a transmitting surface of a central transducer $Tr_0$ in the transmitting transducer group TG1 in the elevation direction $y_0$. Thus, a hypothetical point sound source is formed at the transmitting focusing point Ft by selectively driving a plurality Mt of transmitting transducers in the transmitting transducer group TG1. And transmitting wave-front Wt is propagated from the hypothetical point sound source. According to the present invention, ultrasound echo signals reflected from the transmitting wave-front area are effectively used.

As illustrated in FIG. 2, when an observing point Px corresponded to a pixel of the image data generated in the image processing unit 8 located at a deeper position than the transmission focusing point Ft and separated from the elevation line $y_0$ passing through the transmission focusing point Ft in the azimuth direction, the transmitting ultrasound waves (Wt) emitted from the hypothetical point sound source Ft propagate to the observing point Px with spreading a distance Dx. A portion of the spread transmitting ultrasound wave-fronts are reflected at the observing point Px and are received by a plurality (Mr) of the receiving transducer group RG1 in the ultrasound probe 4. Accordingly, the receiving phase compensation for focusing and summation and the transmitting wave-front compensation and summation are performed based on the propagated distance Dx from the hypothetical point sound source Ft to the observing point Px, and also each of propagated distances from the observing point Px to each of the transducers in the plurality of receiving transducer group RG1. The details are explained later.

On the other hand, as illustrated in FIG. 3, if the observing point Px is located at a shallower position than the transmission focusing point Ft, it can assume that the transmitting wave-front emitted from the transmitting transducer group TG1 and focused at the transmission focusing point Ft a distance Df in the elevation direction $y_0$ propagates an opposite (negative) direction from the hypothetical point sound source Ft to the observing point Px by a negative propagation distance (−Dx). Accordingly, the receiving phase compensation for focusing and summation and the transmitting wave-front compensation and summation are performed based on the negative propagated distance −Dx from the hypothetical point sound source Ft to the observing point Px, and also each of propagated distances from the observing point Px to each of the transducers in the plurality of receiving transducer group RG1.

During reception time of the reflected ultrasounds, it becomes possible to form receiving beams focused at a plurality of observation points in a wide range along a depth direction by successively renewing the delay times based on the control signals supplied from the phase compensation and summation control unit 12 in order to move the receiving focus point from a deeper position to a shallower position along elevation direction.

As explained above, the transmitting wave-front compensation and summation unit 6 in the ultrasound diagnosis apparatus 100 consistent with the present invention includes a receiving signal memory unit 61, a transmitting wave-front delay correction unit 62 and an accumulation unit 63. The receiving signal memory unit 61 stores the phase compensated and summed receiving signals of Mx channels acquired through the ultrasound transmissions and receptions between each of the selected plurality Mx of transmitting transducer groups TG1, TG2, - - - , TGx and the selected receiving transducer group RG1 by successively shifting along the arrayed direction of the transducers.

The transmitting wave-front delay correction unit 62 reads the Mx channels in-phase added reception signals stored in the receiving signals memory unit 61. Further, based on the delay time data supplied from the phase compensation and summation control unit 12, the transmitting wave-front delay correction unit 62 gives delay times to the receiving signals in order to correct relative transmission delays occurring due to differences of the propagation distances from each of the Mx transmission focusing points constructed by each of the transmitting transducer groups TG1, TG2, - - - , TGx to the observing point Px designated in correspondence with a pixel of image data.

The accumulation unit 63 compounds the phase delays corrected receiving signals in the transmission delay correction unit 62 by summation. Thus, the phase compensated and summed receiving signals of Mx channels acquired with shifting the transmitting focus point Ft along an array direction of the transducers have performed transmitting wave-front compensation and summation through the transmission delay correction unit 62 and the accumulation 63. To reduce side lobes of the transmission beams generated by the transmitting wave-front compensation and summation, it is possible to perform the summation in the accumulation 63 with performing a prescribed apodization to the phase compensated and summed receiving signals supplied from the transmission delay correction unit 62.

The phase compensation and summation control unit 12 calculates each propagation distance from the observing point Px to each of the plurality Mr of receiving transducers in the receiving transducer group RG1 based on the selection data for the receiving transducer group supplied from the scan control unit 11. Further, the phase compensation and summation control unit 12 calculates propagation distances from each of the plurality Mx of transmitting focus points Ft to the observing point Px based on the selection data for the transmitting transducer group supplied from the scan control unit 11 and the distance Df data of the transmission focusing point supplied the input unit 10 through the system control unit 13. The phase compensation and summation control unit 12 also sets each delay time for performing the transmitting wave-front compensation and summation in order to correct the relative transmitting wave-front delays occurring due to each of the propagation distances and sets a number of the phase compensated and summed receiving signals for supplying to the transmitting wave-front compensation and summation unit 6 based on the position data of the transmitting focus point Ft and the observing point Px.

Then, the phase compensation and summation control unit 12 supplies delay time data for performing the receiving phase compensation and summation to the receiving phase compensation for focusing and summation unit 53 in the reception unit 5. Further, the phase compensation and summation control unit 12 supplies delay time data for performing the transmitting wave-front phase compensation and summation and the number data of the receiving signals to the transmitting wave-front delay correction unit 62 in the transmitting wave-front phase compensation and summation unit 6. By supplying these data, the phase compensation and summation control unit 12 controls the receiving phase compensation for focusing and summation and the transmitting wave-front phase compensation and summation for the receiving signals acquired from the observing point Px through the plurality Mx of transmitting transducer groups TG1~TGx and the receiving transducer group RG1.

The system control unit 13 includes a central processing unit (CPU) and a memory circuit (not shown). The memory circuit stores various data being inputted and set through the input unit 10. The CPU in the system control unit 13 totally controls each of units in the ultrasound diagnosis apparatus 100 based on the input data or the set data in the memory circuit. By performing the receiving phase compensation and summation and the transmitting wave-front compensation and summation to the plurality channels of receiving signals acquired through the receiving transducer group, it becomes possible to generate and display image data of high spatial resolution, a high contrast resolution and a good signal-to-noise (S/N) ratio. The system control unit 13 includes a position setting function of the observing point Px in the object. For instance, the system control unit 13 sets the observing point Px at the position in the object corresponded to each pixel of the image data generated by the image data generation unit 8.

Figure 4:
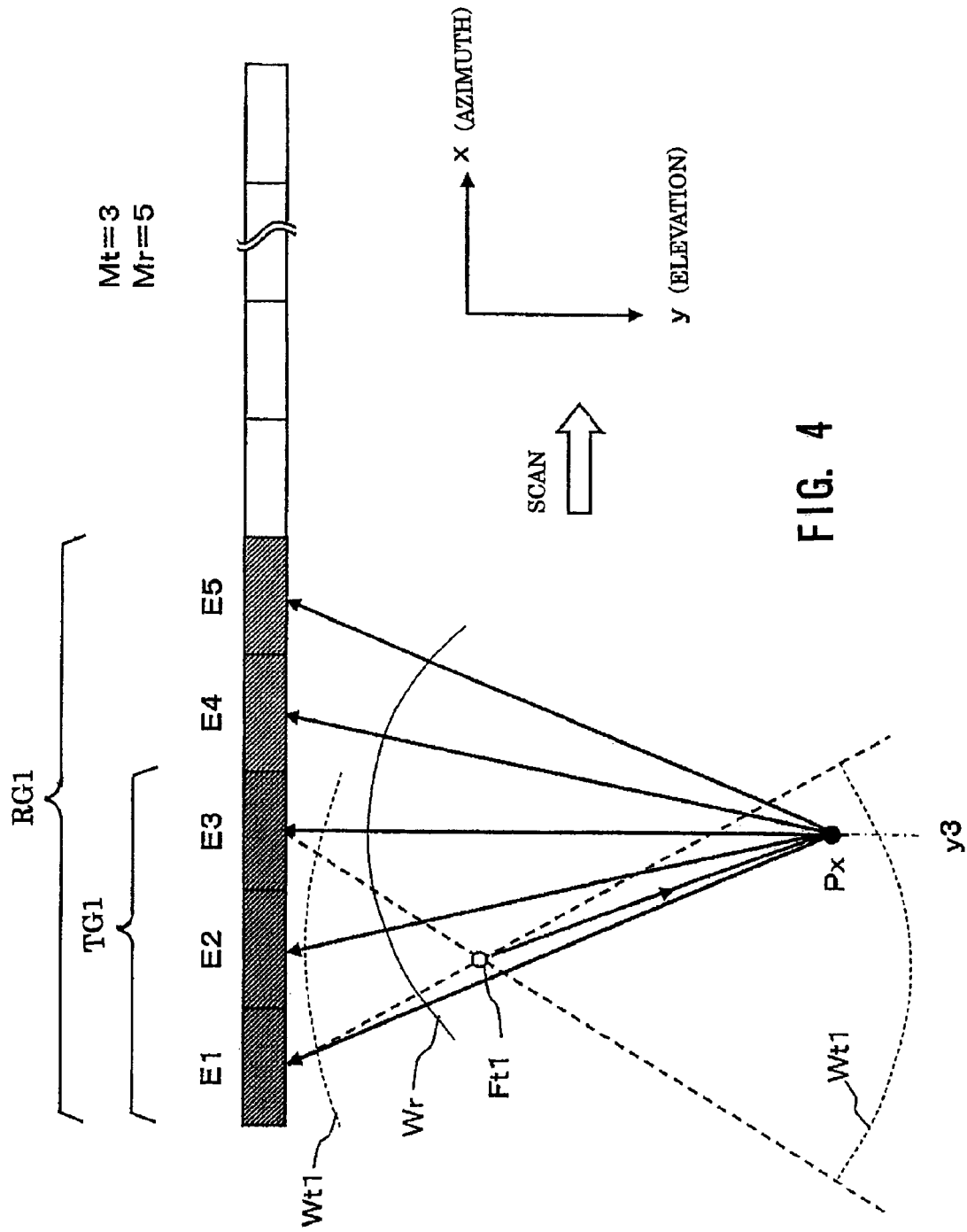
FIG. 4 illustrates receiving phase compensation for focusing and summation of receiving signals in the preferred embodiment shown in FIG. 1.
Figure 5:
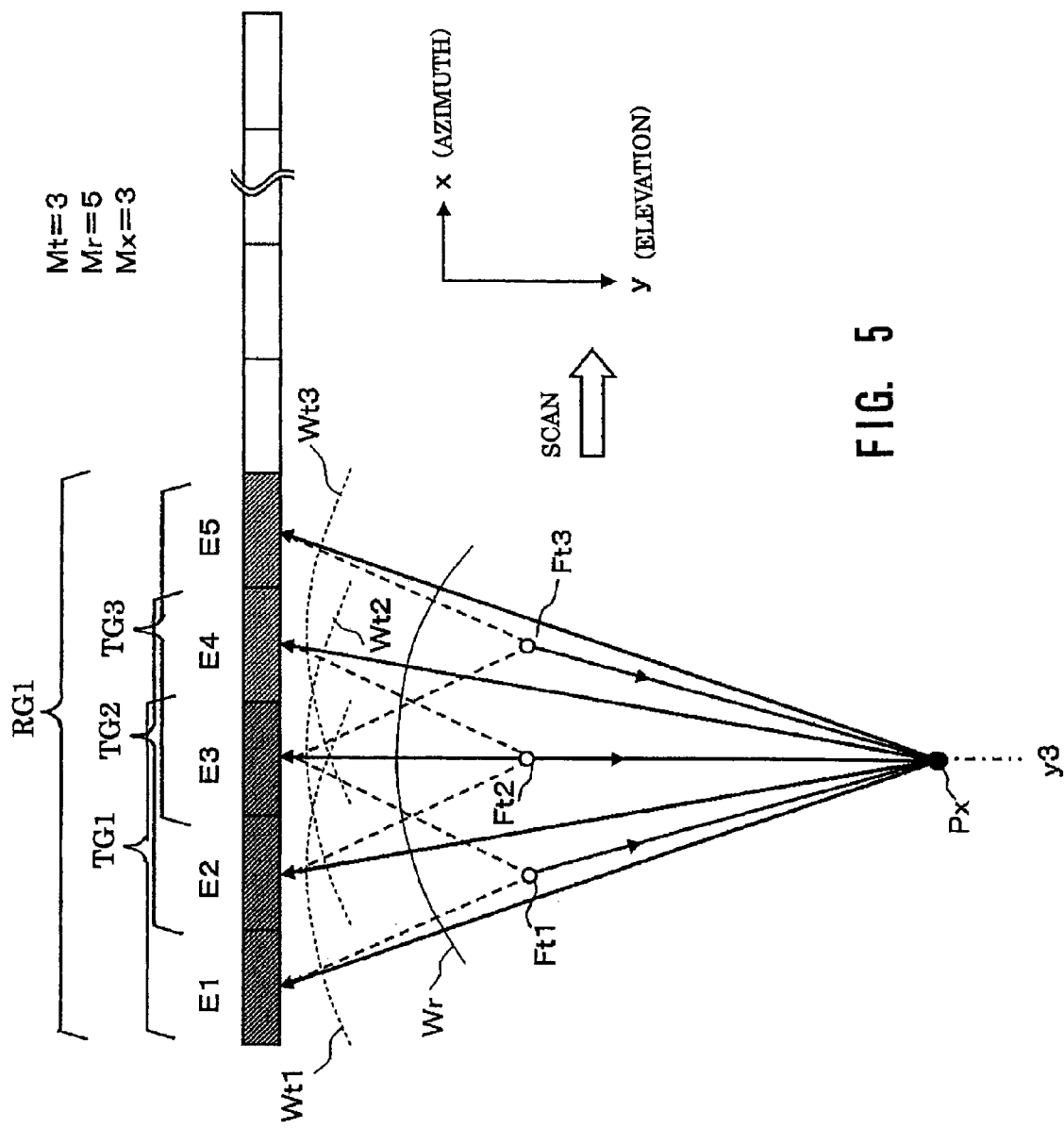
FIG. 5 illustrates transmitting wave-front phase compensation and summation performed in the transmitting wave-front delays correction unit shown in FIG. 1.

With reference to FIGS. 4 and 5, the receiving phase compensation and summation being performed by the receiving phase compensation for focusing and summation unit 53 in the reception unit 5 and the transmitting wave-front compensation and summation being performed by the transmitting wave-front compensation and summation unit 6 are explained. For easy understanding, it is supposed that the number Mt of a plurality transducers in one transmitting transducer group TG is 3, the number Mr of a plurality of transducers in one receiving transducer group RG is 5 and the number Mx of a plurality of transmitting transducer groups TGx is 3. In an actual case, the ultrasound transmissions/receptions are performed by using several tens to several hundreds of transducers as one transmitting transducer group and one receiving transducer group.

In FIGS. 4 and 5, it is supposed that the receiving phase compensation/summation and the transmitting wave-front compensation/summation are performed when the observing point Px is located at a deeper position than the transmitting focus point Ft. Of course, it is also possible to perform the receiving phase compensation/summation and the transmitting wave-front compensation/summation when the observing point Px is located at a shallower position than the transmitting focus point Ft by utilizing the negative propagation distance as explained in FIG. 3.

FIG. 4 illustrates the receiving phase compensation/summation during the ultrasound transmission/reception performed by using a first transmitting transducer group TG1 comprised of the transducers E1 to E3 and a receiving transducer group RG1 comprised of the transducers E1 to E5. Based on a transmitting wave-front function generated by the wave-front function generating unit 21 in the transmission unit 2, transmission ultrasounds are emitted through the plurality of transducers E1-E3 and are focused at the transmitting focus point Ft. After focusing, transmission ultrasounds are again dispersed as a wave-front Wt1. Thus, a hypothetical point sound source is constructed at the transmitting focus point Ft1. Further, the wave-front Wt1 of transmitting ultrasounds is emitted from the hypothetical point sound source into the object.

The wave-front Wt1 of transmitting ultrasounds emitted from the transmitting focus point Ft1 are reflected, for instance, at the observing point Px that corresponds to a pixel of image data on an elevation line y3 for a transducer E3 and receiving ultrasound wave-fronts Wr are generated from the hypothetical point sound source. The receiving wave-fronts Wr are received through the transducers E1 to E5 in the receiving transducer group RG1. At this time, the 5-channel reception signals acquired though the transducers E1 to E5 have relative reception delays due to differences of the respective propagation distance from the observing point Px to the respective surfaces of the transducers E1 to E5.

To the 5-channel reception signals acquired from the observing point Px though the transducers E1 to E5, the receiving phase compensation/summation unit 53 in the reception unit 5 (FIG. 1) executes the summation with adding delay times for arranging phases of the reception signals. Thus, the receiving phase compensation for focusing and summation is performed. By performing this receiving phase compensation/summation, a reception focus point is formed at the observing point Px. Accordingly, it becomes possible to selectively receive reception ultrasounds from the observing point Px.

Similarly, by controlling the delay times based on the above-mentioned dynamic focusing method, a plurality of reception focus points to a plurality of observing points located at designated positions along a depth (elevation) direction is formed at the substantially same time. The reception ultrasounds reflected from these observing points also can be selectively received for performing the receiving phase compensation and summation in the receiving phase compensation/summation unit 53. The phase compensated/summed reception signals are stored in the reception signals memory unit 61 in the transmitting wave-front compensation/summation unit 6 with attaching position data of the transmitting focus point Ft1 as an affix data.

With reference to FIG. 5, the transmitting wave-front compensation and summation for the ultrasound transmission/reception by using three transmitting transducer groups and one receiving transducer group is explained. Thus, ultrasounds emitted from a first selected transmitting transducer group TG1 comprised of the transducers E1 to E3 are focused at the first transmitting focus point Ft1. Ultrasounds emitted from a second selected transmitting transducer group TG2 comprised of the transducers E2 to E4 are focused at the first transmitting focus point Ft2. Further, ultrasounds emitted from a third selected transmitting transducer group TG3 comprised of the transducers E3 to E5 are focused at the first transmitting focus point Ft3. These hypothetical point sound sources Ft1-Ft3 emit transmission ultrasounds and a receiving wave-front Wr of echo signals reflected at an observing point Px that locates on an elevation line y3 is received through the receiving transducer group RG1 comprised of the transducers E1 to E5.

First reception signals are received through the receiving transducer group RG1 by using a first ultrasound transmitting wave-front Wt1 from the first transmitting transducer group TG1 and echo ultrasound wave-front Wr reflected at the observing point Px. The first reception signals are performed the receiving phase compensation and summation and stored in the reception signals memory unit 61 in the transmitting wave-front compensation and summation unit 6. Second reception signals are received through the receiving transducer group RG1 by using a second ultrasound transmitting wave-front Wt2 from the second transmitting transducer group TG2 and echo ultrasound wave-front Wr reflected at the observing point Px. The second reception signals are performed the receiving phase compensation and summation and stored in the reception signals memory unit 61. By successively doing similar performance, the third reception signals acquired through the receiving transducer group RG1 by using the third transmitting wave-front Wt3 and the receiving wave-front Wr are performed the receiving phase compensation and summation and stored in the reception signals memory unit 61.

These second and third reception signals also are stored in the reception signals memory unit 61 with respectively affixing position data of the transmission focusing points Ft2 and Ft3 that are formed by the second and third transmitting transducers groups TG2 and TG3, respectively. Usually, the second and third ultrasound receiving wave-fronts Wr2 and Wr3 are designated so as to form the substantially same.

Usually, the wave-front function generating unit 21 designates such that the wave-front Wr2 of the transmission ultrasound and the wave-front Wr3 of the transmission ultrasound are substantially the same shape to the shape of the first ultrasound transmitting wave-front Wt1. The transmission focusing points Ft1 to Ft3 formed by the transmission ultrasounds having these wave-fronts are arranged so that it may become the abbreviation equal distance from transducers array surface. However, such a positioning is not limited.

Then, the transmitting delay correction unit 62 and the summation unit 63 in the transmitting wave-front compensation and summation unit 6 perform the transmitting wave-front compensation and summation to each of the first to third reception signals that are stored in the reception signals memory unit 61 after performing the receiving phase compensation for focusing and summation.

In this case, The first to third reception signals stored in the reception signals memory unit 61 have relative transmission delays due to the differences of propagation distances from each of the transmission focusing points Ft1-Ft3 to the observing point Px as illustrated in FIG. 5.

In order to correct these transmission delays, the transmission delay correction unit 62 gives each correction delay time to each of the first to third reception signals. The summation unit 63 accumulates the first to third reception signals that are corrected the transmission delays (hereinafter, "transmitting wave-front compensation and summation"). By performing the transmitting wave-front compensation and summation, it can obtain the same effect so as that the transmission ultrasounds simultaneously emitted the hypothetical point sound source at the transmission focusing points Ft1 to Ft3 are converged in the observing point Px.

Typically, the number of the phase compensated and summed reception signals for using the transmitting wave-front compensation and summation at the observing point Px is decided by the phase compensation and summation control unit 12 based on the position data of the transmission focusing point Ft and the position data of the observing point Px. For instance, in FIG. 4, if the observing point Px is not included in the emission area of the transmission ultrasounds that is emitted from the hypothetical point sound source (the transmission focusing point Ft1), the first reception signals acquired through the receiving transducers group RG1 does not contribute to transmitting wave-front compensation and summation of the observing point, but also it becomes a factor to increase the noise components. Consequently, it becomes possible to form a good transmission acoustic field at the observing point Px with avoiding side-lobes by performing the transmitting wave-front compensation and summation including omitting the first reception signals, In particular, when the transmission focusing distance Df in the elevation direction and the depth of the observing point Px are equal, it is possible to obtain a transmission acoustic field having a sufficient thin beam width without performing the transmitting wave-front compensation and summation.

According to the present invention, by performing the receiving phase compensation for focusing and summation, and the transmitting wave-front compensation and summation, it becomes possible to form the transmission/reception ultrasound beams that are uniformly converged in an elevation direction. Under the control of the transducers selection unit 3, two-dimensional ultrasound scan is performed on the object by successively shifting the first to the third transmitting transducers groups TG1-TG3 and the receiving transducers group RG1 along the array direction of the transducers. By processing the image data based on the receiving signals that are performed in the transmitting wave-front compensation and summation, it becomes possible to acquire ultrasound images having excellent spatial resolution, contrast resolution, and S/N ratio.

Figure 6A:
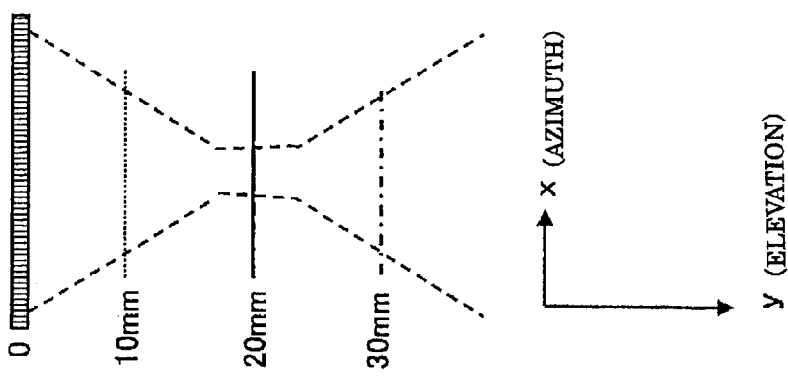
FIG. 6A illustrates focusing areas of transmitting ultrasounds along a depth direction according to background art.
Figure 6B:
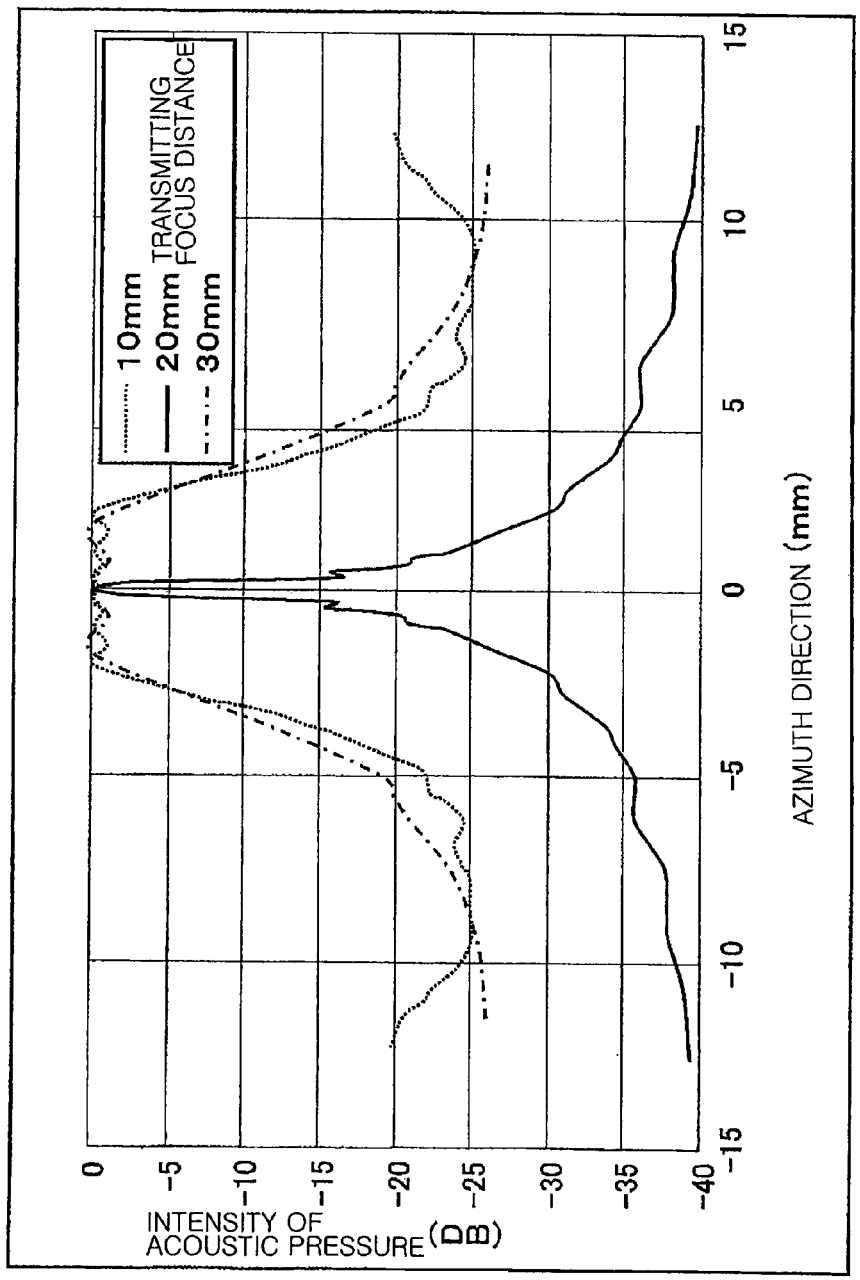
FIG. 6B illustrates transmission intensity of sound pressure (transmitting acoustic field) formed by the transmitting ultrasounds focus at the transmitting focus distances along elevation direction shown in FIG. 6A.

With reference to FIGS. 6 and 7, the effects will be explained by comparing the embodiment consistent with the present invention and the background art. FIG. 6A illustrates distributions of transmitting acoustic pressures in the background art. When transmitting ultrasounds are focused at a transmission focusing distance 20 mm in the elevation direction by using a transmitting transducer group comprised of 256 transducers arrayed in an interval of 0.2 mm, each having a resonant frequency of 7.5 MHz, a transmission acoustic field having a thin beam width is formed at the transmission focusing distance 20 mm. However, as illustrated in FIGS. 6A and 6B, the beam width of the transmission acoustic fields at a 10 mm point that is shallower than the transmission focusing point becomes wider in the azimuth direction. Similarly, the beam width of the transmission acoustic fields at a 30 mm point that is deeper than the transmission focusing point becomes wider in the azimuth direction. These tendencies become much remarkable with an increase in the number of transducer elements and the interval between transducers in the transmitting transducers group.

Figure 7A:
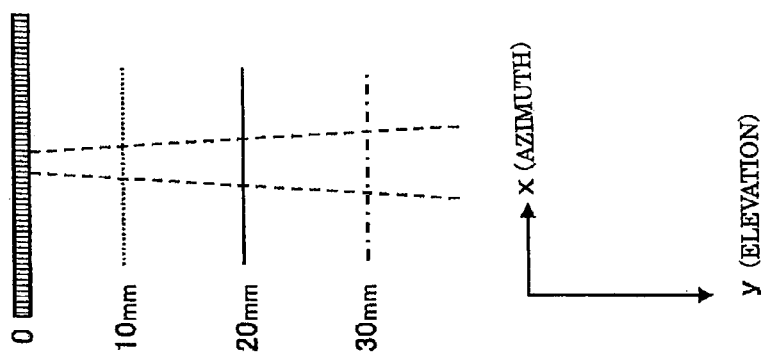
FIG. 7A illustrates focusing areas of transmitting ultrasounds along a depth direction according to the present invention.
Figure 7B:
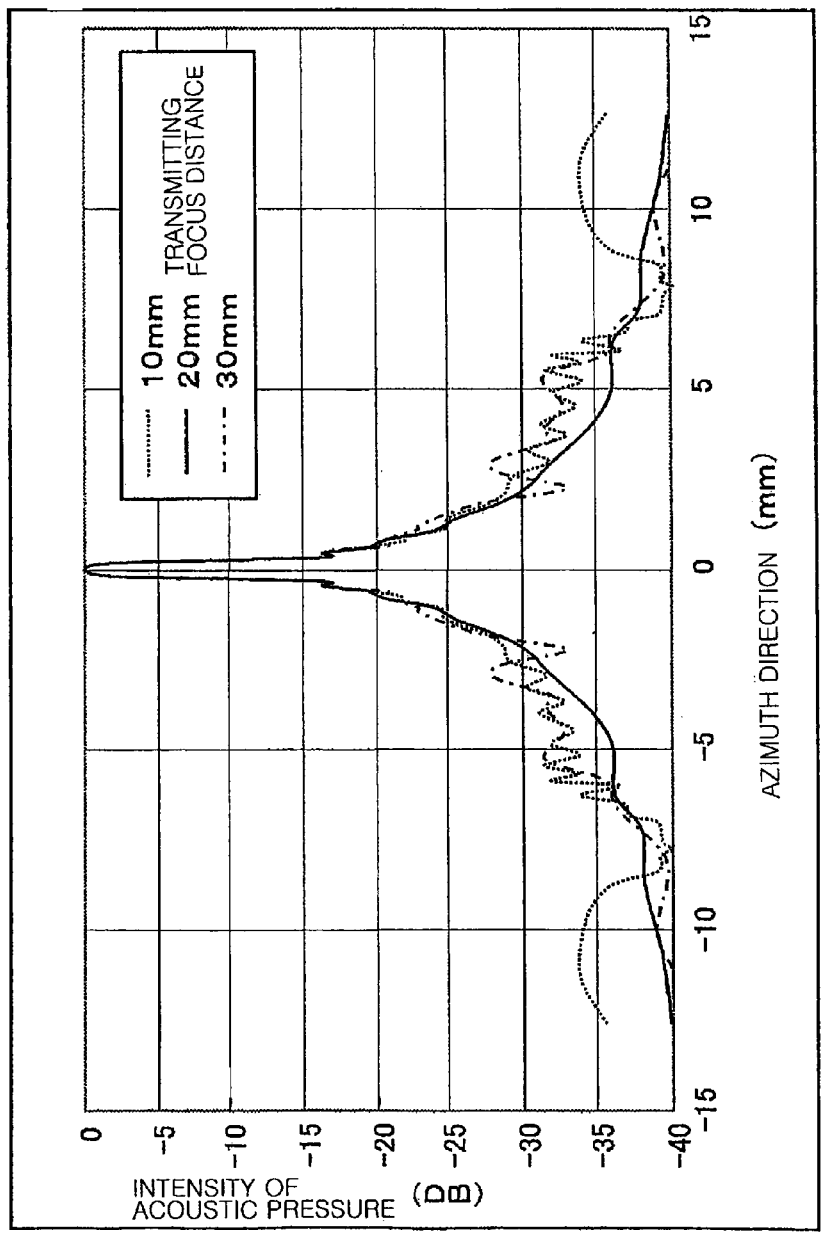
FIG. 7B illustrates transmission intensity of sound pressure (transmitting acoustic field) formed by the transmitting ultrasounds focus at the transmitting focus distances along elevation direction shown in FIG. 7A.

FIGS. 7A and 7B illustrate transmitting waves that are performed in the transmitting wave-front compensation and summation according to the present invention. Thus, a plurality of receiving signals is acquired by shifting the transmitting transducer group along the transducers array direction. Then transmitting wave-front compensation is performed to the plurality of receiving signals. Doing so, as shown in FIG. 7B, it becomes possible to form transmission acoustic fields having the substantially uniform and thin beam widths along the elevation direction.

Figure 8:
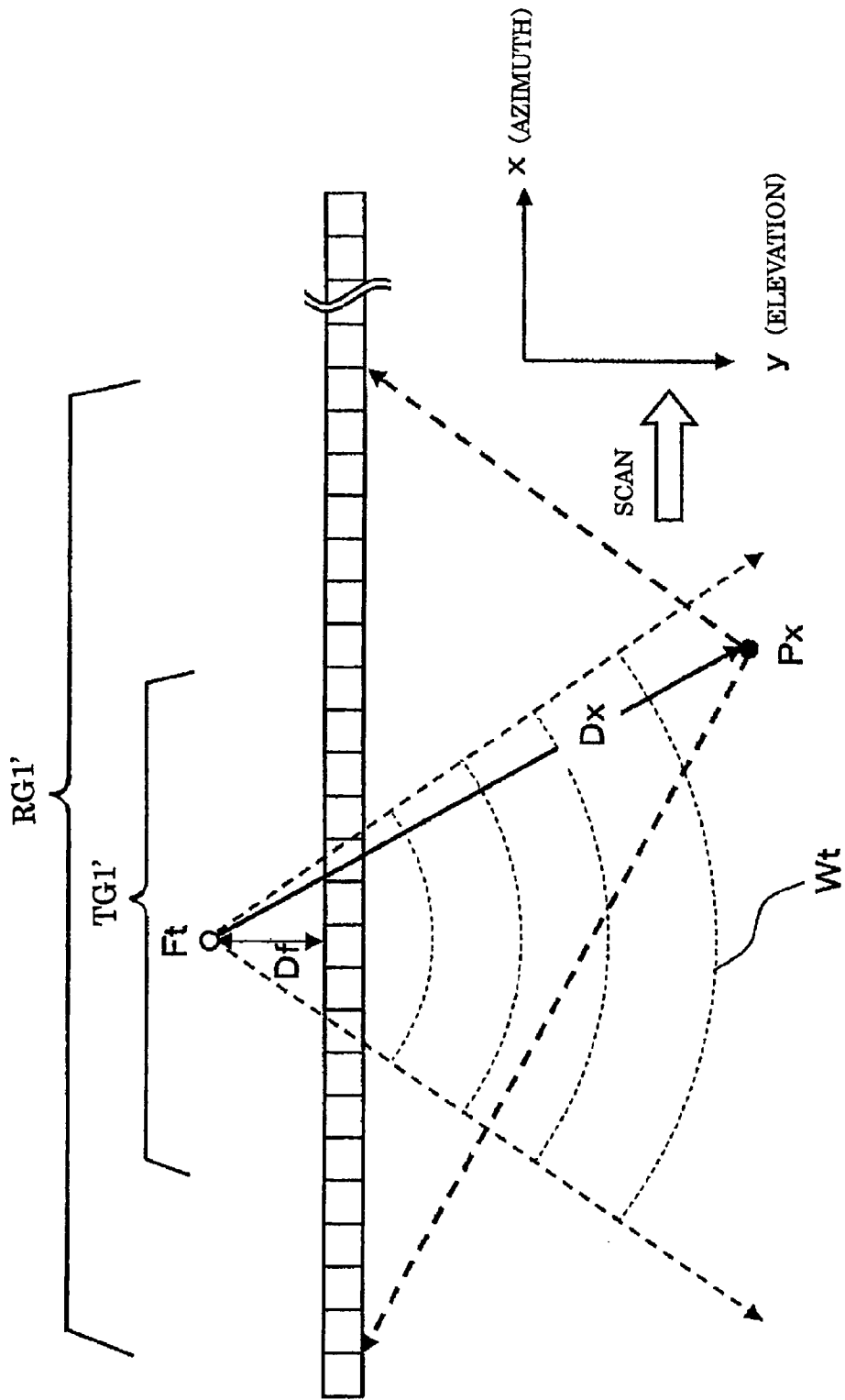
FIG. 8 illustrates wave-fronts of transmitting ultrasound emitted from a transmitting transducers group in a modification of the embodiment shown in FIG. 2.
Figure 9:
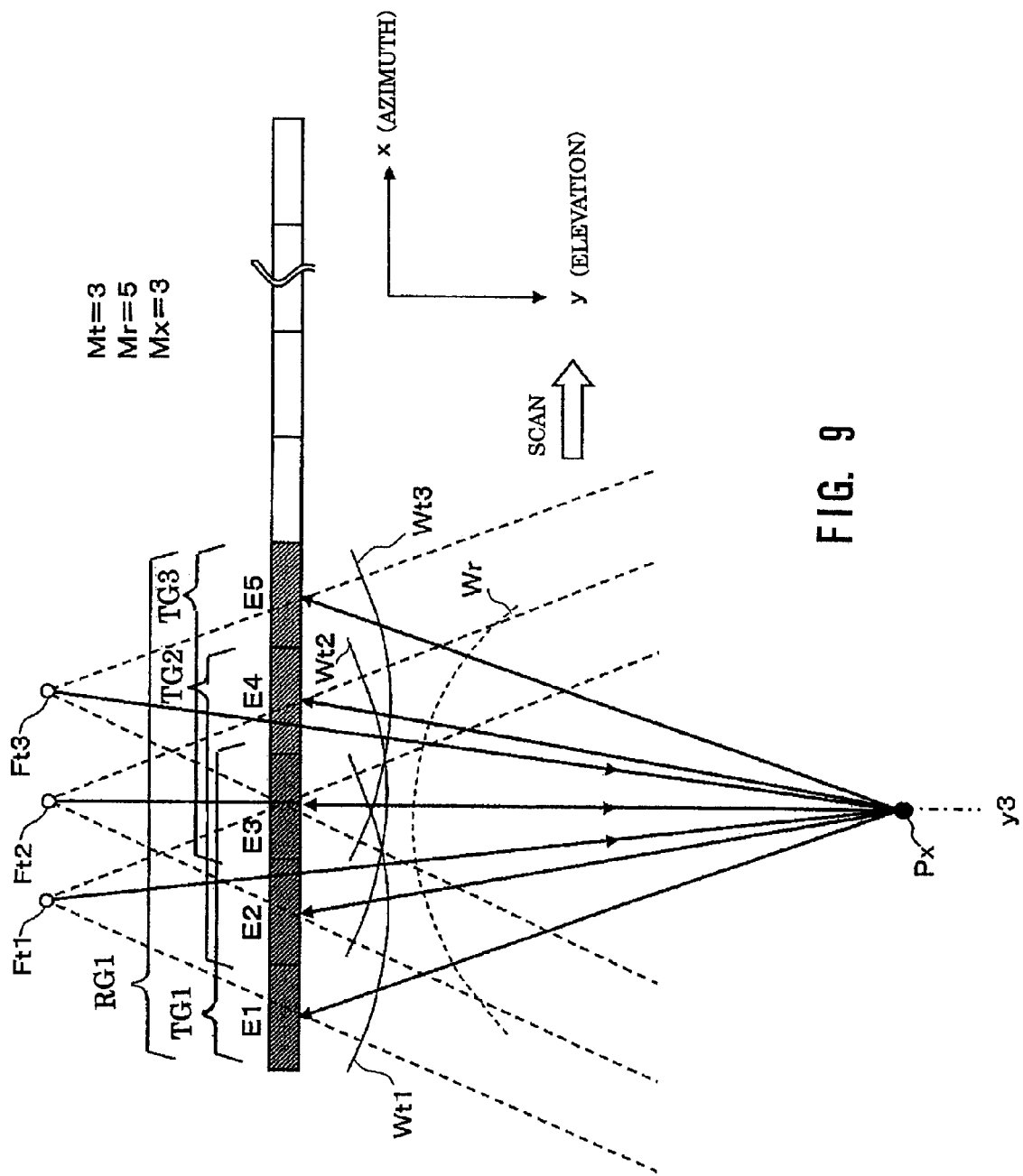
FIG. 9 illustrates receiving phase compensation for focusing and summation and transmitting wave-front phase compensation and summation in the modification of the embodiment shown in FIG. 8.

FIGS. 8 and 9 illustrate a modification of the embodiment consistent with the present invention. As illustrated in FIG. 2, in the above-explained embodiment, a hypothetical point sound source is formed by focusing the transmission ultrasounds emitted from the transmitting transducers group at the transmission focusing point Ft in the object based on the transmission wave-front function generated by the wave-front function generator 21. In this modification of the embodiment, as illustrated in FIG. 8, a hypothetical point sound source is formed at an outside transmission focusing point Ft from the object, i.e., at an opposite direction to the propagating direction of the transmission ultrasound based on the transmission ultrasounds emitted from the transmitting transducers group TG1' by dispersing based on the transmission wave-front function. In this case, the transmission ultrasounds having the wave-front Wt is considered to propagate a distance Dx from the hypothetical point sound source of the transmission focusing point Ft to the observing point Px. The transmission ultrasounds propagated the distance Dx are reflected at the observing point Px and received by the receiving transducers group RG1' comprised of Mr transducers.

FIG. 9 illustrates the receiving phase compensation and summation and the transmitting wave-front compensation and summation in the ultrasound transmissions/receptions by using a first transmitting transducers group TG1 comprised of the transducers E1 to E3, a second transmitting transducers group TG2 comprised of the transducers E2 to E4, a third transmitting transducers group TG3 comprised of the transducers E3 to E5 and a receiving transducers group RG1 comprised of the transducers E1 to E5. Similarly to the explanations in FIGS. 4 and 5, it is supposed that the number Mt of the transducers in the transmitting transducers group TG is 3, the number Mr of the transducers in the receiving transducers group RG is 5 and the number Mx of the transducers in the transmitting transducers group is 3. Of course, the numbers are not so limited.

A wave-front Wt1 of transmission ultrasounds emitted from each of the transducers E1 to E3 comprising a first transmitting transducers group TG1 is formed based on the transmission wave-front function supplied from the wave-front function generator 21 in the transmission unit 2. The transmission ultrasound having the wave-front Wt1 is emitted into the object from the hypothetical transmission focusing point Ft1 as a point sound source.

The transmission ultrasounds emitted from the transmission focusing point Ft1 reflect at the observing point Px and generate reception ultrasounds having a wave-front Wr. The reception ultrasounds are received through the transducers E1 to E5 comprising the receiving transducers group RG1. These reception signals of 5 channels acquired through each of the reception signals transducers E1 to E5 have relative reception delays due to each of the differences of the propagated distances from the observing point Px to each of the transducers E1 to E5.

To correct these reception delays of the 5 channels reception signals, the receiving phases compensation and summation unit 53 in the reception unit 5 (FIG. 1) gives delay times for performing the receiving phase compensation and summation. By performing the receiving phase compensation and summation, a reception focusing point is formed at the observing point Px. Thus, it becomes possible to selectively receive the reception ultrasounds from the observing point Px.

Further, a plurality of reception focusing points against a plurality of observing points designated along a depth direction are formed by controlling the delay times based on the above-mentioned dynamic focusing method. These reception ultrasounds from the plurality of observing points also are selectively received. The first reception signals performed in the receiving phases compensation and summation unit 53 are stored in the reception signals memory unit 61 of the transmitting wave-front compensation and summation unit 6 including affixing the position data of the transmission focusing point Ft1 formed by the first transmitting transducers group.

A next ultrasound transmission/reception by a transmission ultrasound of a wave-front Wt2 through the second transmitting transducers group TG2 and a reception ultrasound of a wave-front Wr through the receiving transducers group RG1 and a following ultrasound transmission/reception by a transmission ultrasound of a wave-front Wt3 through the third transmitting transducers group TG3 and the reception ultrasound of the wave-front Wr through the receiving transducers group RG1 are successively executed. After performing the receiving phase compensation and summations, the second and third reception signals are stored in the reception signals memory unit 61 including affixing the second and third position data of the transmission focusing points Ft2 and Ft3 formed by the second and third transmitting transducers groups, respectively.

Then, the first to the third reception signals stored in the reception signals memory unit 61 have performed the transmitting wave-front compensation and summation by the transmission delay correction unit 62 and the adder 63 in the transmitting wave-front compensation and summation unit 6.

As illustrated in FIG. 9, each of the first to the third reception signals has a relative transmission delay due to the differences of the propagation distances from each of the hypothetical transmission focusing points Ft1 to Ft3 to the observing point Px. The transmission delay correction unit 62 affords delay times to each of the first to the third reception signals for arranging in phases by correcting the transmission delays. The adder 63 composes these first to third reception signals corrected transmission delays by addition. Thus, the transmitting wave-front compensation and summation is performed.

To the image data generated in the above-mentioned embodiments, there is a trade-off relationship between the space resolution or the contrast resolution and the time resolution. Thus, the beam width of the transmission beam depends upon an array aperture of the plurality of transmission focusing points. The array aperture is a product of the number of transmission focusing points and an array interval. When the array interval is rough, the transmission beam generates non-permissible side-lobes. Accordingly, in case that space resolution or contrast resolution is required rather than time resolution, acquiring of reception signals required for transmitting wave-front compensation and summation is performed by successively emitting ultrasounds from a plurality of transmission focusing points designated by a small array interval.

According to the above-mentioned embodiments, it becomes possible to form the transmission beam and the reception beam, each having a substantially uniform thin beam width along a depth direction of the object in a high precision and a high sensitivity, by performing the receiving phase compensation and summation and the transmitting wave-front compensation and summation against the reception signals acquired through the plurality of transducers comprising the receiving transducers group. Thus, it becomes possible to generate and display excellent image data in the space resolution and the contrast resolution and S/N ratio.

In particular, since the transmitting wave-front compensation and summation is performed to the in-phased added reception signals acquired through different transmitting transducers groups, the transmission/reception sensitivity can be raised in accordance with the increase in the number of times of addition in transmitting wave-front compensation and summation. Consequently, image data having a high S/N ratio can be acquired in contrast with the conventional multi-stages focusing method in which the in-phased added reception signals acquired from the transmission focusing area are extracted and composed.

According to the above-mentioned embodiment, the hypothetical point sound source is formed by focusing transmission ultrasounds emitted from a plurality of transducers comprising the transmitting transducers group in the object in order to emit strong transmitting ultrasounds. Consequently, it becomes more effective for a tissue harmonic imaging (THI) method that needs high transmission energy for imaging the harmonics components that are generated by a non-linear propagation in the tissue of the object.

In the modification of the embodiment, the transmitting sensitivity of the dispersed ultrasounds emitted into an object deteriorates in comparison to the usage of the focused transmission ultrasounds. However, it is beneficial to apply to the imaging method that requires transmitting ultrasounds of uniform and low acoustic pressures in a wide range in the object, such as contrast harmonic imaging (CHI) method with using an ultrasound contrast agent. According to such an application, it becomes possible to detect the receiving signals with a high sensitivity from the ultrasound contrast agent coupled with restraining the harmonics components.

In the above-mentioned embodiment and the modification, firstly, the Mr channel receiving signals are acquired through ultrasound transmissions/receptions by using each of the plurality Mx of transmitting transducer groups and one receiving transducer group from the observing point Px for performing the receiving phase compensation and summation. Then the phase compensated and summed receiving signals of the plurality Mr of channels are performed the transmitting wave-front compensation and summation. On the contrary, according to the second embodiment, the receiving phase compensation/summation and the transmitting wave-front compensation/summation are performed approximately at the same time to the reception signals of a plurality Mz (Mz=Mx·Mr) of channels acquired through ultrasound transmissions/receptions by using each of the plurality Mx of transmitting transducer groups and one receiving transducer group from the observing point Px.

Figure 10:
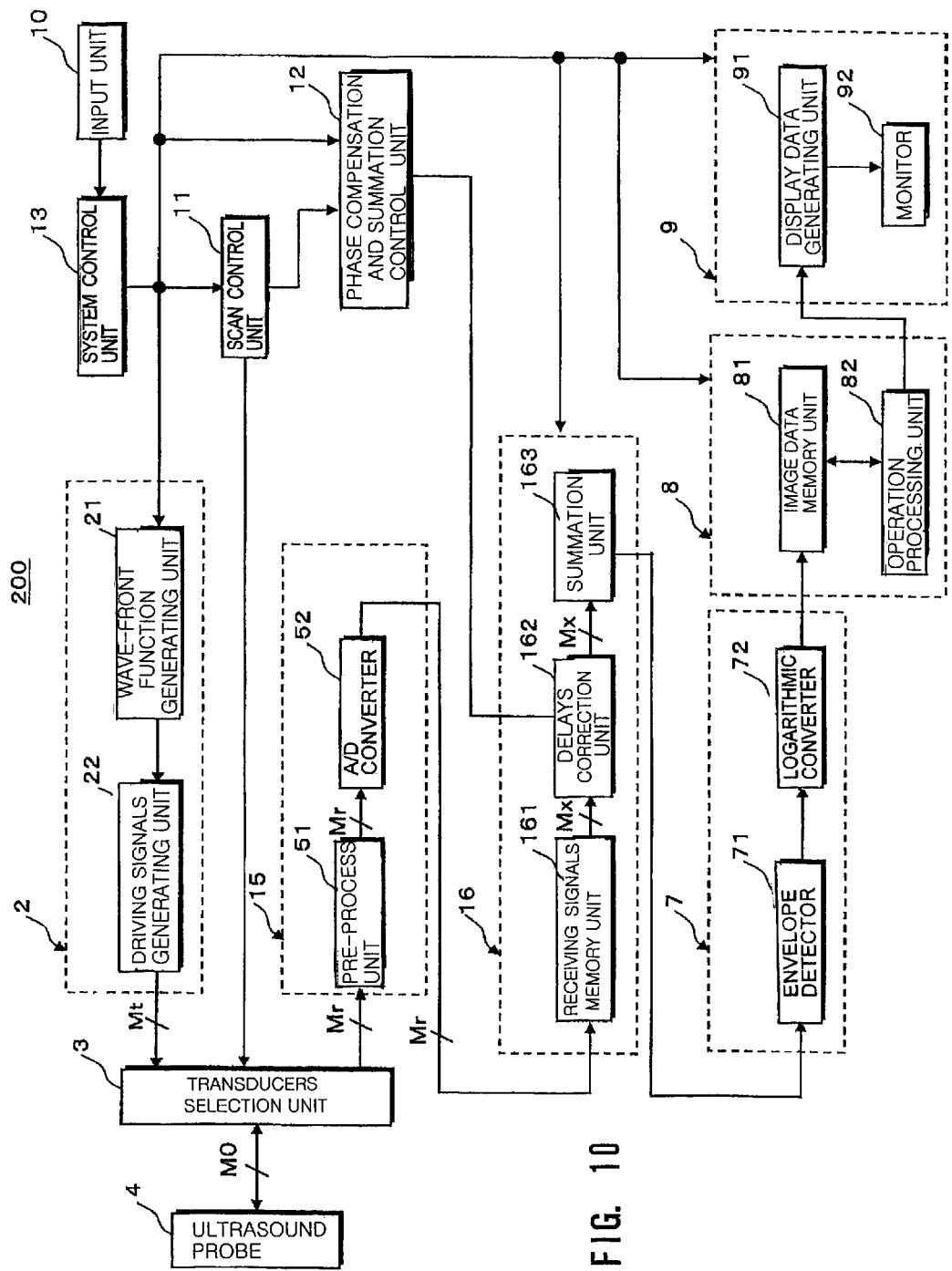
FIG. 10 is a block diagram illustrating an ultrasound diagnosis apparatus in accordance with another embodiment of the present invention.

FIG. 10 is a block diagram for illustrating the second embodiment of the ultrasound diagnosis apparatus consistent with the present invention. In FIG. 10, the units having the same composition and function as the units shown in FIG. 1 are presented by the same numbers in order to omit the same explanations.

In FIG. 10, the ultrasound diagnosis apparatus 200 includes an ultrasound probe 4 including arrayed Mo transducers for emitting ultrasounds to an object and converting echo ultrasounds reflected from the object to receiving signals, a transducers selection unit 3 for selecting a transmitting transducer group TG and a receiving transducer group RG for using the plurality ultrasound transmissions/receptions among the plurality Mo of transducers, a transmission unit 2 for supplying drive signals to the transmitting transducer group TG for focusing or dispersing the transmitting ultrasounds to the object, a reception unit 15 for performing a pre-processing to the plurality Mr channels of receiving signals acquired through the receiving transducer group RG corresponding to the ultrasounds transmissions to the object and a phase compensation and summation unit 16 for performing the receiving phase compensation/summation and the transmitting wave-front compensation/summation to receiving signals acquired through the ultrasound transmissions/receptions between each of the plurality Mx of transmitting transducers group TG that is selected by successively shifting along the array direction of the transducers by the transducers selection unit 3 and the receiving transducers group RG.

The ultrasound diagnosis apparatus 200 further includes an image signal generating unit 7 for generating B mode image data by processing the receiving signals that have performed the receiving phase compensation/summation and the transmitting wave-front compensation/summation, an image processing unit 8 for processing image data based on a plurality of image data that is acquired by successively renewing the directions for the ultrasound transmissions/receptions with shifting a pair of the plurality Mx of transmitting transducers groups and the receiving transducers group along the array direction of the transducers, a display unit 9 for displaying the acquired image data, an input unit 10 for inputting object data, settings of image data generating conditions and image data displaying conditions, setting a transmission converging distance, setting a number Mt of the transmission transducers and a number Mt of the reception transducers and inputting various command signals, a scan control unit 11 for controlling the ultrasound scan over the object by selectively controlling the transducers groups for using the ultrasound transmissions/receptions, a phase compensation and summation control unit 12 for controlling the receiving phase compensation/summation and the transmitting wave-front compensation/and summation performed in the phasing unit 16 and a system control unit 13 for totally controlling each unit in the apparatus.

The reception unit 15 of the ultrasound diagnosis apparatus 200 includes a pre-processing unit 51 and an A/D converter 52. The pre-processing unit 51 includes an amplifier for amplifying the reception signals of Mr channels supplied from the ultrasound probe 4 through the transducers selection unit 3 in order to secure a sufficient S/N and a filter circuit for restricting a band of the reception signals outputted from the amplifier in order to prevent return noises from occurring during sampling operations of the A/D converter 52. The A/D converter 52 converts the reception signals of the plurality Mr of channels supplied from the pre-processing unit 51 to digital signals.

The phase compensation/summation unit 16 includes a reception signals memory unit 161, a delay correction unit 162 and a summation unit 163. The reception signals memory unit 161 successively stores reception signals of the plurality Mz (Mz=Mx·Mr) of channels acquired in time series through the ultrasound transmissions and receptions by using each of the plurality Mx of transmitting transducer groups and the receiving transducer group.

The delay correction unit 162 gives delay times to the reception signals of Mz channels read out from the reception signals memory unit 161 in order to correct relative transmission delays due to differences of the propagation distances from a hypothetical point sound source in the object or an outside of the object that is designated by each of Mx transducers in a transmitting transducers group to the observing point Px and relative reception delays due to differences of the propagation distances from the observing point Px to each of Mr transducers in a receiving transducers group. The summation unit 163 performs the summation to the corrected reception signals of Mz channels.

According to the second embodiment, as is similar to the first embodiment with further modifications, it becomes possible to generate the transmission beams and the reception beams having a substantially uniform thin beam width along a depth (elevation) direction of the object with a high accuracy and a high sensitivity by performing the receiving phase compensation/summation and the transmitting wave-front compensation/summation to the reception signals acquired through a plurality of transducers in the receiving transducers group. Consequently, it becomes possible to generate and display excellent image data in space resolution and contrast resolution and S/N ratio.

In particular, since the transmitting wave-front compensation/summation is executed to the phase compensated and summed receiving signals acquired by using different transmitting transducer groups, it becomes possible to improve the sensitivity of the ultrasound transmissions/receptions in accordance with an increase in the summations in the transmitting wave-front compensation and summation. Accordingly, it becomes possible to produce image data of a high S/N ratio as compared with the conventional multi-stages focusing method that compounds by extracting the reception signal phase compensated and summed receiving signals only acquired from the transmitting focus area.

When transmission ultrasounds emitted from a plurality of transducers in a transmitting transducers group are focused in the object, it becomes possible to construct a point sound source that can emit strong transmission ultrasounds at the hypothetical point. According this becomes a benefit for the tissue harmonic imaging (THI) method that needs a high transmission energy for imaging harmonic components generated by a nonlinear propagation in the tissue of the object.

On the other hand, when transmission ultrasounds emitted from a plurality of transducers in a transmitting transducers group are spread in the object, while the transmission energy density in the object is reduced compared to using the focused transmission ultrasounds, it becomes possible to detect the reception signals with a high sensitivity from the ultrasound contrast agents and restrict the harmonic components by applying to the imaging method a required transmission ultrasound of a uniform and a low sound pressure in a wide range in the object, such as a contrast harmonic imaging (CHI) method that uses ultrasound contrast agents.

Further, according to the second embodiment, since the receiving phase compensation and summation and the transmitting wave-front compensation and summation are performed at substantially the same time in the same unit, it becomes easier to carry out the phasing processing per pixel of image data. Consequently, an mage processing, such as an interpolation processing, becomes unnecessary, and processing time is largely shortened. Further, circuit compositions can be simplified.

The present invention, of course, is not limited to the above-explained embodiments. For instance, it is possible to apply the present invention to a sector scan type ultrasound diagnosis apparatus or a convex scan type ultrasound diagnosis apparatus. In order to apply to the convex scan type ultrasound diagnosis apparatus, as is similar to the above-explained linear scan type ultrasound diagnosis apparatus, a plurality of transmission focusing points is successively designated by shifting a transmitting transducers group along an array direction of the transducers. In order to apply to the sector scan type ultrasound diagnosis apparatus, a plurality of transmission focusing points is successively designated by renewing the direction of the transmission focusing point along with controlling the delay times to the drive signals.

Figure 11:
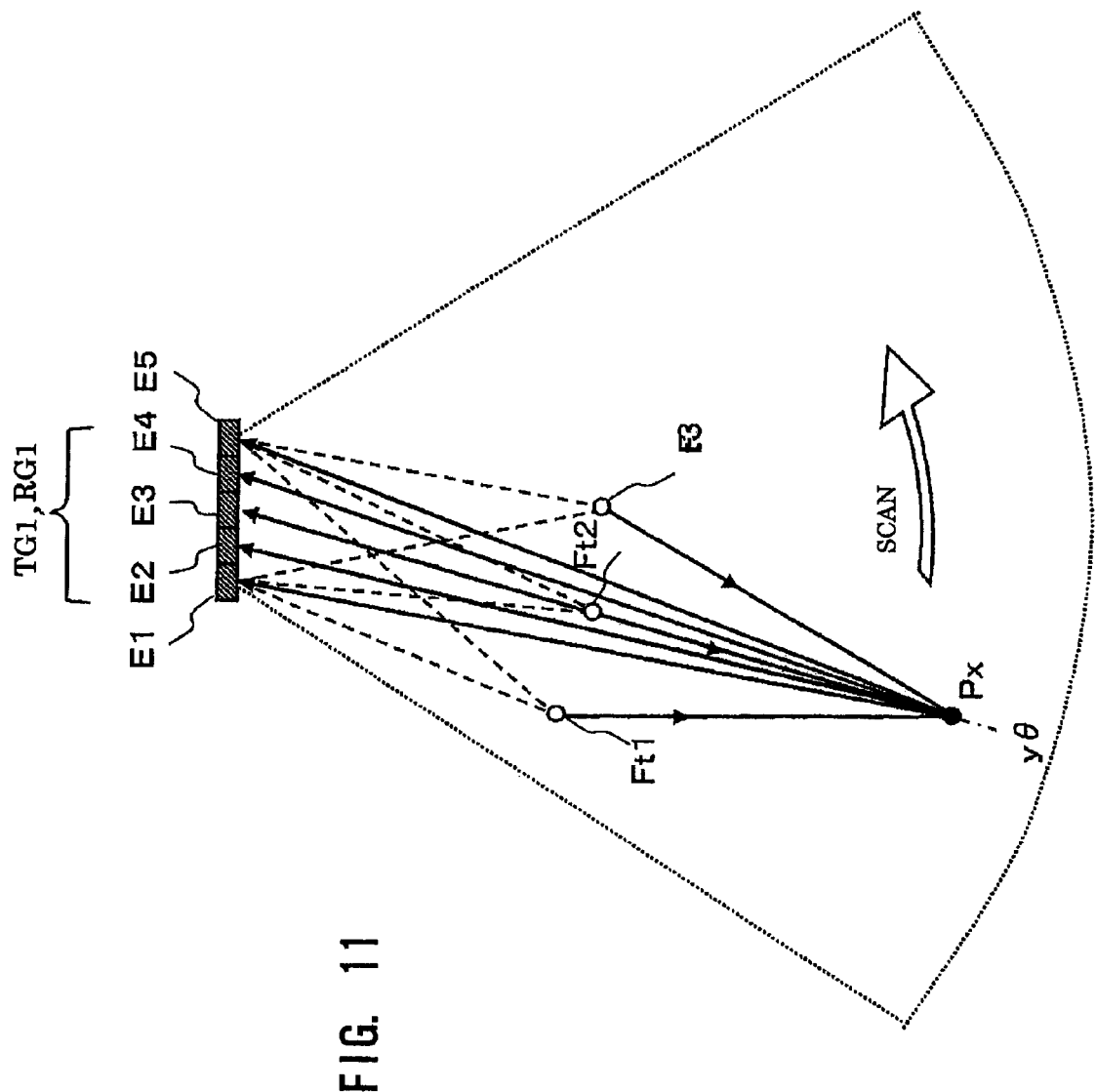
FIG. 11 illustrates receiving phase compensation for focusing and summation and transmitting wave-front phase compensation and summation in a sector scan type ultrasound diagnosis apparatus consistent with the present invention.

FIG. 11 illustrates the receiving phase compensation and summation and the transmitting wave-front compensation and summation performed in the sector scan type ultrasound diagnosis apparatus. To provide an easy understanding, it is assumed that each of the numbers for the transmitting transducers group and for the receiving transducers group is five (5) and the number for the transmission focusing point is three (3).

In FIG. 11, the transmission ultrasounds emitted from the transmitting transducers group converge at a transmission focusing point Ft1 and form a hypothetical point sound source. The transmission ultrasounds emitted from the point sound source are received through the transducers E1 to E5 comprising a receiving transducers group by reflecting at an observing point Px that corresponds to a pixel of image data. At this time, the receiving phase compensation and summation unit 53 in the reception unit 5 shown in FIG. 1 provides delay times to each of the 5 channels reception signals in order to correct relative reception delays due to the propagation distance differences from the observing point Px to each of the transducers E1 to E5 and performs the addition and compounding i.e., the receiving phase compensation and summation.

Further, by controlling the delay times based on the conventional dynamic focusing method, the reception focusing points are formed to a plurality of observing points set up along the elevation direction. Then, the acquired in-phased added reception signals (a first reception signal) are stored in the reception signals memory unit 61 of the transmitting wave-front compensation and summation unit 6 with attachment of position data of the transmission focusing point Ft1 as an affix data.

Similarly, ultrasound transmissions/receptions are successively executed by setting the points Ft2 and Ft3 as the transmission focusing points and the observing point Px as the reception focusing point. The acquired in-phased added reception signals (a second and a third reception signals) also stored in the reception signals memory unit 61. The transmitting wave-front compensation and summation unit 6 shown in FIG. 1 provides delay times to each of the first to third reception signals in order to correct the relative transmission delays due to the propagation distance differences from the transmission focusing points Ft1 to Ft3 to the observing point Px and performs the addition compounding (transmitting wave-front compensation and summation).

Then, two dimensional (2-D) ultrasound scan is performed by moving the transmission focusing points Ft1 to Ft3 in conjunction with keeping the relative position relationships along a scan direction shown in FIG. 11. The image data is generated based on the plurality of transmission in-phased reception signals.

In the embodiment illustrated in FIG. 11, the receiving phase compensation and summation and the transmitting wave-front compensation and summation are performed on the reception signals acquired from the observing points set on the central axis of one reception beam. It is also possible to perform the phasing of the reception signals acquired by applying the so-called parallel simultaneous reception method that simultaneously forms a plurality of reception beams in a plurality of directions.

Figure 12:
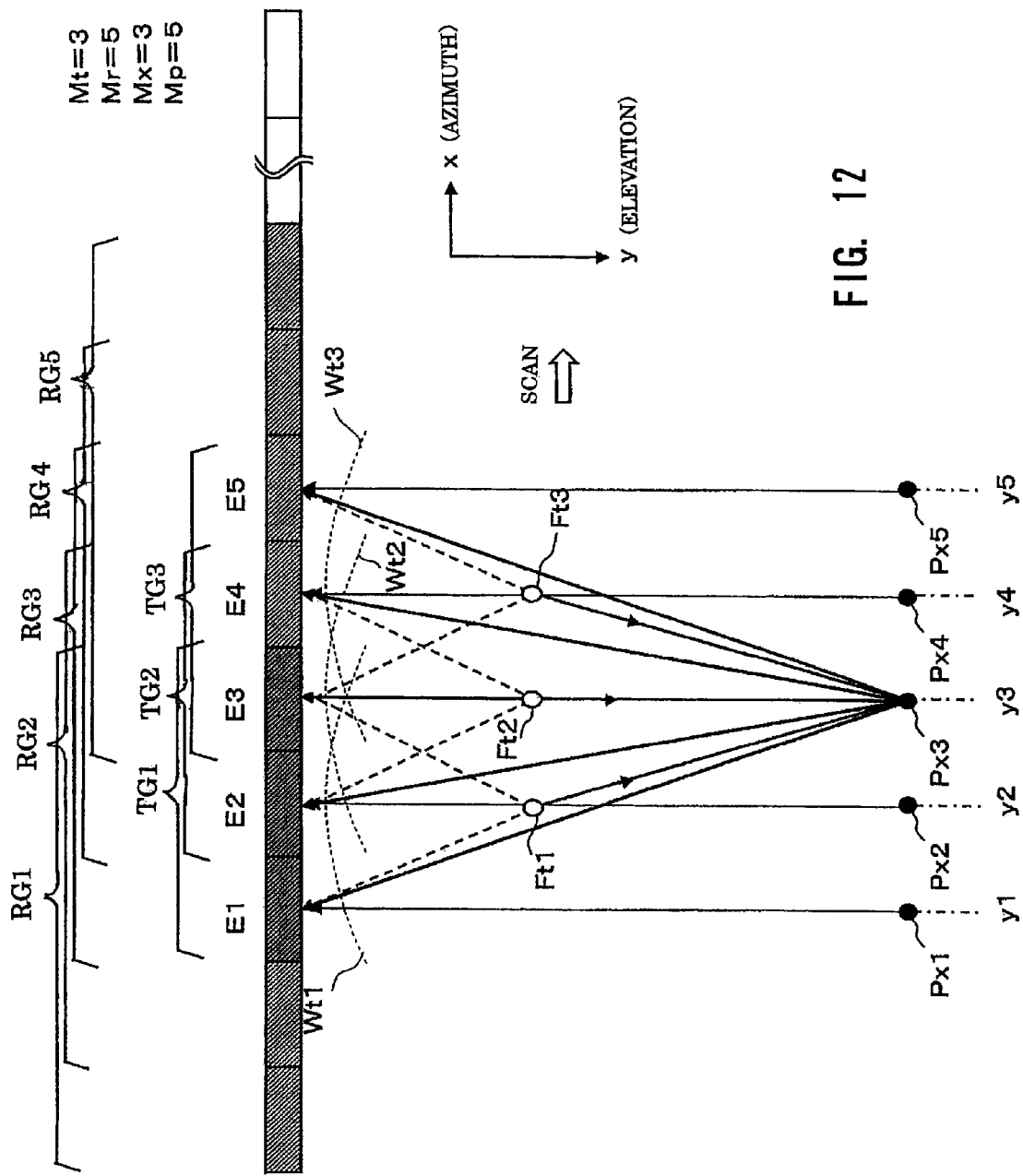
FIG. 12 illustrates receiving phase compensation for focusing and summation and transmitting wave-front phase compensation and summation in a simultaneously parallel receiving type ultrasound diagnosis apparatus consistent with the present invention.

With reference to FIG. 12, the receiving phase compensation/summation and the transmitting wave-front compensation and summation is explained in a case where they are applied to the parallel simultaneous receptions. In this embodiment, it is also assumed that a number Mt of the transducers in the transmitting transducers group is 3, a number Mr of the transducers in the receiving transducers group is 5, a number Mx of the transmitting transducers groups is 3 and a number Mp of the parallel simultaneous receptions is 5.

In FIG. 12, transmission ultrasounds emitted from each of the transducers E1 to E3 comprising a first transmitting transducers group TG1 are focused and again propagated to and from a first transmitting focus point Ft1. Thus, a hypothetical point sound source is formed at the transmitting focus point Ft1, and the transmission ultrasound wave-front Wt1 is emitted into the object so as that the point sound source is a start point.

The transmission ultrasounds emitted from the transmission focusing point Ft1 reflect each of the observing points Px1 to Px5 of a plurality number (Mp) of parallel simultaneous receptions (Mp=5) that are designated along a plurality of elevation directions y1, y2, - - - , y5. The reflected signals are received through the receiving transducers group that is comprised of a plurality number Mp (Mp=5) of transducers groups. For instance, each of the transducer groups Mp is comprised of a plurality number Mr (Mr=5) of transducers so as that each of transducers E1 to E5 becomes a center of the respective transducer groups Mp. In this case, each of Mr channel reception signals acquired through each transducer in the receiving transducers group has relative reception delay due to the differences of propagation distances form each of the observing points Px1 to Px5 to the respective receiving transducers in the group.

The receiving phase compensation/summation unit 53 in the reception unit 5 performs the phase compensation and summation of the Mr channel reception signals acquired through each of the plurality of receiving transducers groups while affording delay times for correcting the above-mentioned reception delays. By doing so, the receiving focus points are formed at the observing points Px1 to Px5 and the receiving ultrasounds from the observing points Px1 to Px5 are selectively received through the respective receiving transducers groups. Further, by controlling the delay times in the similar steps based on the dynamic focusing method, the receiving focus points are formed at a plurality of observing points that are designated in a depth direction. The receiving ultrasounds from these observing points also are selectively received. And the first receiving signals of Mp channels acquired through the plurality Mp receiving transducers groups after performing the receiving phase compensation/summation are stored in the receiving signals memory unit 61 of the transmitting wave-front compensation and summation unit 6 along with attaching the position data of the transmission focusing point Ft1 as an affix data.

By the similar steps, ultrasound transmissions/receptions by using a second transmitting transducer groups comprised of the transducers E2 to E4 and the plurality Mp of receiving transducer groups and ultrasound transmissions/receptions by using a third transmitting transducer groups comprised of the transducers E3 to E5 and the plurality Mp of receiving transducer groups are successively performed for acquiring the second and third receiving signals of Mp channels, respectively. The acquired second and third reception signals are also stored in the receiving signals memory unit 61 along with attaching the position data of the transmission focusing point Ft2 or the transmission focusing point Ft3 formed by the second transmitting transducer groups or the third transmitting transducer groups as the respective affix data.

The first to third receiving signals stored in the receiving signals memory unit 61, after performing the receiving phase compensation/summation in the unit of the receiving transducers group, are read out by the transmitting wave-front delay correction unit 62 and the summation unit 63 in the transmitting wave-front compensation and summation unit 6 shown in FIG. 1, and have performed the transmitting wave-front compensation and summation based on each of the position data of the transmitting focus points Ft1 to Ft3. By performing the transmitting wave-front compensation and summation, the receiving signals of the plurality Mp channels corresponded to the number Mp of the parallel simultaneous receptions are generated at substantially the same time. Consequently, it becomes possible to largely improve the frame rate for the image data.

In particular, according to a method for emitting transmission ultrasounds dispersed from the transmitting transducers groups, since it is possible to emit the transmitting ultrasounds to a relatively wide area in the object, it becomes possible to designate the much larger number Mp of the parallel simultaneous receptions. Consequently, it is possible to obtain much higher frame rate.

In the above, the receiving phase compensation/summation and the transmitting wave-front compensation and summation in a sector scan type and in the parallel simultaneous reception are performed. It is further possible to use a two dimensionally (2-D) arrayed ultrasound probe or to an ultrasound probe for mechanically shifting the plurality of 1-D arrayed transducers at a high speed.

While the observing point Px explained in this embodiment is designated so as to correspond with a pixel of the image data, it is also possible to set the observing point for a linear scan type apparatus on a central axis of the receiving transducers group, or to set the observing point for a sector scan type apparatus on a central axis of the reception beams.

Further, in this embodiment, while the reception signals of radio frequency (RF) waves acquired through the receiving transducers group are performed the receiving phase compensation/summation and the transmitting wave-front compensation/summation, it is also possible to perform the receiving phase compensation/summation and the transmitting wave-front compensation/summation to the I component (real component) and Q component (imaginary component) that are acquired by performing the orthogonal phase detection or the Hilbert transformation to the RF waves. In this case, the pre-processing unit 51 in the reception unit 5 shown in FIG. 1 includes an orthogonal phase detection circuit or a Hilbert transformation circuit in addition to the amplifier and a filter circuit.

As explained above, in this embodiment, it becomes possible to display with emphasized ultrasound contrast reagent by application to an imaging method that requires uniform and low acoustic pressure ultrasounds over a wide scope in the object, such as the contrast harmonic imaging (CHI) method using the dispersed transmission ultrasounds. It is also possible to obtain similar effects by setting the transmitting focus point in a deeper position than the image displaying area. According to this method, it is also possible to compensate the image data S/N deteriorations in the deeper area due to absorptions of transmitting ultrasounds into the tissues of the object.

Other embodiments consistent with the present invention will be apparent to those skilled in the art from consideration of the specification and practice of the present invention disclosed herein. It is intended that the specification and examples be considered as exemplary only, with the true scope and spirit of the present invention being indicated by the following claims.

The invention claimed is:

1. An ultrasound diagnosis apparatus configured to generate image data based on reception signals acquired through ultrasound transmission/reception to and from an object, the ultrasound diagnosis apparatus comprising:
    an ultrasound probe including a plurality of transmitting transducer groups, each of the plurality of transmitting transducer groups including a respective plurality of adjacent transducers, and a receiving transducer group including a plurality of adjacent transducers;
    a transducer selection unit configured to select the plurality of transmitting transducer groups and the receiving transducer group so that a number of transducers in each transmitting transducer group is different than a number of transducers in the receiving transducer group;
    a transmission unit configured to drive each of the plurality of transmitting transducer groups in order to emit corresponding focusing wave-fronts or propagation wave-fronts so as to form a hypothetical point sound source for the object;
    a receiving phase compensation/summation unit configured to perform receiving phase compensation for focusing and summation of a plurality of channels of receiving signals acquired through the receiving transducer group based on reflected ultrasounds from observing points in the object;
    a transmission wave-front phase compensation/summation unit configured to perform wave-front phase compensation and summation for a plurality of channels of receiving signals that are acquired through ultrasound transmissions/receptions by the receiving transducer group and the plurality of transmitting transducer groups for successively renewing the point sound source;
    a scanning control unit configured to perform ultrasound scans of the object by controlling directions for the ultrasound transmissions/receptions; and an image processing unit configured to generate ultrasound image data based on the phase compensated and summed receiving signals acquired through the ultrasound scans.

2. The ultrasound diagnosis apparatus according to claim 1, wherein the receiving phase compensation/summation unit is configured to perform receiving phase compensation for focusing and summation of a plurality of channel reception signals acquired through the receiving transducer group in order to correct relative receiving delays due to propagation differences from the observing point to each of the transducers in the receiving transducer group.

3. The ultrasound diagnosis apparatus according to claim 1, wherein the transmission wave-front phase compensation/summation unit is configured to correct the relative transmitting delays due to differences of the propagation distances from each of the point sound sources to the observing point against the phase compensated receiving signals of a plurality of channels acquired by renewing the position of the point sound source.

4. The ultrasound diagnosis apparatus according to claim 1, wherein the receiving phase compensation/summation unit is configured to perform the receiving phase compensation for focusing and summation of the receiving signals based on the reflection waves from the observing points being set in a plurality of directions to the object so as to form the receiving beams in the plurality of directions wherein parallel simultaneous reception is generated at substantially the same time.

5. The ultrasound diagnosis apparatus according to claim 1, wherein the receiving phase compensation/summation unit and the transmission wave-front phase compensation/summation unit are configured to perform the receiving phase compensation for focusing and summation and the transmission phase compensation and summation by using either one of an I component or a Q component of the receiving signals received through the receiving transducer group by executing orthogonal phase detection or Hilbert transformation.

6. The ultrasound diagnosis apparatus according to claim 1, wherein the transmission unit is configured to form the point sound source in the object by driving each transmitting transducer group with drive signals based on a prescribed wave-front function.

7. The ultrasound diagnosis apparatus according to claim 1, wherein the transmission unit is configured to form the point sound source outside of the object by driving each transmitting transducer group with drive signals based on a prescribed wave-front function.

8. The ultrasound diagnosis apparatus according to claim 1, wherein
the scanning control unit is configured to control the transducer selection unit so as to successively renew the position of the point sound source formed by the transmitting transducer groups.

9. The ultrasound diagnosis apparatus according to claim 1, further comprising:
an observing point designation unit, the observing point designation unit being configured to designate the observing point at positions in the object corresponding to each pixel of the image data generated by the image data processing unit.

10. The ultrasound diagnosis apparatus according to claim 1, further comprising:
an observing point designation unit, the observing point designation unit being configured to designate the observing point on a central axis of reception beams formed by the receiving phase compensation/summation unit or the transmission wave-front phase compensation/summation unit.

11. The ultrasound diagnosis apparatus of claim 1, wherein the number of transducers in the receiving transducer group is larger than the number of transducers in each transmitting transducer group.

12. The ultrasound diagnosis apparatus of claim 1, wherein at least two of the plurality of transmitting transducer groups overlap and have at least one common transducer.

13. An ultrasound diagnosis apparatus configured to generate image data based on reception signals acquired through an ultrasound transmission/reception to and from an object, the ultrasound diagnosis apparatus comprising:
an ultrasound probe including a plurality of transmitting transducer groups, each of the plurality of transmitting transducer groups including a respective plurality of adjacent transducers, and a receiving transducer group including a plurality of adjacent transducers;
a transducer selection unit configured to select the plurality of transmitting transducer groups and the receiving transducer group so that a number of transducers in each transmitting transducer group is different than a number of transducers in the receiving transducer group;
a transmission unit configured to drive each of the plurality of transmitting transducer groups in order to emit corresponding focusing wave-fronts or propagation wave-fronts so as to form a hypothetical point sound source for the object;
a receiving phase compensation/summation unit configured to perform receiving phase compensation for focusing and summation of a plurality of channels of receiving signals acquired through the receiving transducer group for successively renewing the position of the point sound source;
a scanning control unit configured to perform ultrasound scans of the object by controlling directions for the ultrasound transmissions/receptions; and
an image processing unit configured to generate ultrasound image data based on the phase compensated and summed receiving signals acquired through the ultrasound scans.

14. The ultrasound diagnosis apparatus according to claim 13, wherein the receiving phase compensation/summation unit is configured to perform phase compensation of the plurality of channel reception signals acquired through the receiving transducer group by successively renewing the position of the point sound source so as to correct the relative transmission delays due to the propagation distances from each of the point sound sources to the observing point and to correct the relative reception delays due to propagation distances from the observing point to each of the transducers in the receiving transducer group.

15. The ultrasound diagnosis apparatus according to claim 13, wherein the receiving phase compensation/summation unit is configured to perform phase compensation of the receiving signals acquired through the receiving transducer group by using an I component and a Q component of the signal that are acquired through an orthogonal phase detection or the Hilbert transformation.

16. The ultrasound diagnosis apparatus according to claim 13, wherein the receiving phase compensation/summation unit is configured to perform receiving phase compensation for focusing and summation for the receiving signals based on the reflected ultrasound wave-fronts at the observing points being set in a plurality of directions for the object so as to form the reception beams corresponded to the plurality of directions substantially simultaneously.

17. The ultrasound diagnosis apparatus according to claim 13, wherein the transmission unit is configured to form the point sound source in the object by driving the transmitting transducer groups with drive signals based on a prescribed wave-front function.

18. The ultrasound diagnosis apparatus according to claim 13, wherein the transmission unit is configured to form the point sound source outside of the object by driving the transmitting transducer group groups with drive signals based on a prescribed wave-front function.

19. The ultrasound diagnosis apparatus according to claim 13, wherein the scanning control unit is configured to control the transducer selection unit so as to successively renew the position of the point sound source formed by the transmitting transducer groups.

20. The ultrasound diagnosis apparatus according to claim 13, wherein the transducer selection unit is configured to successively renew the position of the point sound source by selecting the transducers in the transmitting transducer groups with shifting along an arrayed direction of the transducers.

21. The ultrasound diagnosis apparatus according to claim 13, further comprising:
an observing point designation unit, the observing point designation unit being configured to designate the observing point at positions in the object corresponding to each pixel of the image data generated by the image data processing unit.

22. The ultrasound diagnosis apparatus according to claim 13, further comprising:
an observing point designation unit, the observing point designation unit being configured to designate the observing point on a central axis of reception beams formed by the receiving phase compensation/summation unit.

* * * * *